United States Patent
Ijuin et al.

(10) Patent No.: US 12,116,960 B2
(45) Date of Patent: Oct. 15, 2024

(54) INTERNAL COMBUSTION ENGINE AND METHOD FOR CONTROLLING INTERNAL COMBUSTION ENGINE

(71) Applicant: KABUSHIKI KAISHA TOYOTA JIDOSHOKKI, Kariya (JP)

(72) Inventors: Takashi Ijuin, Kariya (JP); Shoji Yajima, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 0 days.

(21) Appl. No.: 18/287,403

(22) PCT Filed: Feb. 8, 2022

(86) PCT No.: PCT/JP2022/004832
§ 371 (c)(1),
(2) Date: Oct. 18, 2023

(87) PCT Pub. No.: WO2022/224545
PCT Pub. Date: Oct. 27, 2022

(65) Prior Publication Data
US 2024/0209816 A1     Jun. 27, 2024

(30) Foreign Application Priority Data
Apr. 23, 2021   (JP) ................................. 2021-073133

(51) Int. Cl.
 F02M 26/00     (2016.01)
 F02M 26/24     (2016.01)
 F02M 26/50     (2016.01)

(52) U.S. Cl.
 CPC ............ *F02M 26/24* (2016.02); *F02M 26/50* (2016.02)

(58) Field of Classification Search
CPC ............................... F02M 26/24; F02M 26/50
See application file for complete search history.

(56) References Cited

U.S. PATENT DOCUMENTS 8,028,522 B2 * 10/2011 Irmler .................... F02M 26/24
                                                    123/41.31
2008/0196679 A1 * 8/2008 Irmler .................... F02M 26/31
                                                    123/41.65
(Continued)

FOREIGN PATENT DOCUMENTS

JP      2007-198310 A      8/2007
JP      2011-038440 A      2/2011
(Continued)

OTHER PUBLICATIONS

International Search Report for PCT/JP2022/004832 dated Apr. 26, 2022 (PCT/ISA/210).

*Primary Examiner* — Phutthiwat Wongwian
*Assistant Examiner* — Sherman D Manley
(74) *Attorney, Agent, or Firm* — Sughrue Mion, PLLC

(57) ABSTRACT

A deposit amount calculation unit calculates an accumulation amount $\Sigma Dp$ of deposit by using an amount of fuel injection fq and a rotation speed NE as parameters, and when the accumulation amount $\Sigma Dp$ exceeds a first threshold value, then an inlet and an outlet of an EGR cooler are switched. A condensed water calculation unit calculates a retention amount $\Sigma Cw$ of condensed water by using the amount of fuel injection fq and the rotation speed NE as parameters, and when the retention amount $\Sigma Cw$ exceeds a second threshold value, then the inlet and the outlet of the EGR cooler are switched.

8 Claims, 22 Drawing Sheets

(56) References Cited

U.S. PATENT DOCUMENTS

| | | |
|---|---|---|
| 2009/0007891 A1 | 1/2009 | Rollet |
| 2015/0211962 A1* | 7/2015 | Sun .................... G01N 33/0036 |
| | | 702/24 |
| 2018/0245536 A1* | 8/2018 | Tobe ........................ F02B 77/04 |
| 2019/0162096 A1* | 5/2019 | Hoehne ................. F01N 3/2066 |
| 2019/0234268 A1* | 8/2019 | Mori ........................ F02B 37/02 |

FOREIGN PATENT DOCUMENTS

| | | |
|---|---|---|
| JP | 2011-132852 A | 7/2011 |
| WO | 2007/039702 A1 | 4/2007 |
| WO | 2015/141754 A1 | 9/2015 |

* cited by examiner

INTERNAL COMBUSTION ENGINE AND METHOD FOR CONTROLLING INTERNAL COMBUSTION ENGINE

CROSS REFERENCE TO RELATED APPLICATIONS

This application is a National Stage of International Application No. PCT/JP2022/004832 filed Feb. 8, 2022, claiming priority based on Japanese Patent Application No. 2021-073133 filed Apr. 23, 2021.

TECHNICAL FIELD

The present disclosure relates to an internal combustion engine and a method for controlling the internal combustion engine, and particularly to an internal combustion engine including an exhaust gas recirculation device and a method for controlling the internal combustion engine.

BACKGROUND

An internal combustion engine including an exhaust gas recirculation device (EGR device) that refluxes to an intake system a part of exhaust for the purpose of reducing nitrogen oxide (NOx) contained in exhaust (exhaust gas) discharged from the internal combustion engine and improving fuel efficiency is known. The lower the temperature of the part of the exhaust refluxed to an intake system (hereinafter, also referred to as EGR gas) is, the higher the density of the EGR gas is, which provides a better NOx reducing effect and a better fuel efficiency effect. Therefore, an EGR device equipped with an EGR cooler for cooling the EGR gas is also known.

When the EGR gas is cooled by the EGR cooler, the EGR gas loses thermal energy, and kinetic energy thus decreases. Also, when the EGR gas is cooled, condensed water contained in the EGR gas (exhaust) and oil mist are joined to soot in the EGR gas and thereby generate foreign matters (deposit). Therefore, the deposit is accumulated on an EGR cooler outlet side where a flow rate of the EGR gas decreases. Also, since the temperature on the EGR cooler outlet side is low, the condensed water retained on the outlet side of the EGR cooler is not evaporated and remains.

The deposit accumulated in the EGR cooler may lead to clogging or degradation of cooling efficiency of the EGR cooler. In order to eliminate the accumulation of deposit in the EGR cooler, Japanese Patent Laying-Open No. 2011-38440 (PTL 1) discloses an EGR device in which an EGR pipe includes a first EGR branch pipe and a second EGR branch pipe and an intermediate point between the first EGR branch pipe and the second EGR branch pipe is connected to an EGR cooler.

According to the EGR device disclosed in PTL 1, cooling efficiency is determined from an inlet temperature and an outlet temperature of the EGR cooler, and when the cooling efficiency is less than an allowable value, it is determined that soot (deposit) has been accumulated in the EGR cooler, and the inlet and the outlet of the EGR cooler are switched thereby to remove the deposit. Also, the accumulation of deposit may be recognized on the basis of a pressure drop of the EGR cooler.

CITATION LIST

Patent Literature

PTL 1: Japanese Patent Laying-Open No. 2011-38440

SUMMARY

Technical Problem

The EGR device disclosed in PTL 1 estimates accumulation of deposit by using cooling efficiency of the EGR cooler. Since the cooling efficiency is also affected by a flow amount of refrigerant such as cooling water, for example, the cooling efficiency may also drop below an allowable value in a case where the flow amount of refrigerant decreases for some reasons. Also, in a case where accumulation of deposit is recognized on the basis of a pressure drop of the EGR cooler, it is conceivable to determine the pressure drop from a pressure difference between the inlet and the outlet of the EGR cooler, but there may be a likelihood that accumulation of deposit is erroneously recognized due to a large change in pressure difference occurring when the flow amount of EGR gas changes in response to opening, closing, or the like of an EGR valve. Note that it is difficult to estimate the amount of condensed water retained (remaining) in the EGR cooler on the basis of the cooling efficiency and the pressure drop.

An object of the present disclosure is to enable deposit or condensed water to be appropriately removed by relatively accurately estimating the amount of deposit accumulated in an EGR cooler or the amount of condensed water retained in the EGR cooler.

Solution to Problem

An internal combustion engine according to the present disclosure is an internal combustion engine including an exhaust gas recirculation device that refluxes EGR gas, which is a part of exhaust, to an intake passage. The internal combustion engine includes: an EGR cooler that is provided in an EGR passage through which EGR gas flows and that cools EGR gas; a switching unit that switches a direction in which the EGR gas flows between a first mode in which the EGR gas flows through an EGR cooler in a predetermined direction and a second mode in which the EGR gas flows through the EGR cooler in a direction opposite to the predetermined direction; and a control device. The control device includes at least one of a deposit control unit and a condensed water control unit. The deposit control unit includes a deposit amount calculation unit that calculates an accumulation amount of deposit accumulated in the EGR cooler by using, as parameters, an amount of fuel injection and a rotation speed of the internal combustion engine, and a first switching command unit that provides a command to perform switching between the first mode and the second mode when the accumulation amount of deposit exceeds a first threshold value. The condensed water control unit includes a condensed water amount calculation unit that calculates a retention amount of condensed water retained in the EGR cooler by using, as parameters, the amount of fuel injection and the rotation speed of the internal combustion engine, and a second switching command unit that provides a command to perform switching between the first mode and the second mode when the retention amount of condensed water exceeds a second threshold value.

With this configuration, it is possible to switch an inlet and an outlet of the EGR cooler by the switching unit performing switching between the first mode in which the EGR gas flows through the EGR cooler in the predetermined direction and the second mode in which the EGR gas flows through the EGR cooler in the direction opposite to the predetermined direction.

The control device includes at least one of the deposit control unit and the condensed water control unit. In the deposit control unit, the deposit amount calculation unit calculates the accumulation amount of deposit accumulated in the EGR cooler by using, as parameters, the amount of fuel injection and the rotation speed of the internal combustion engine, and when the accumulation amount of deposit exceeds the first threshold value, the first switching command unit provides a command to perform switching between the first mode and the second mode. When the accumulation amount of deposit accumulated in the EGR cooler exceeds the first threshold value, the inlet and the outlet of the EGR cooler are switched, and it is thus possible to remove the accumulated deposit. The amount of deposit accumulated in the EGR cooler changes depending on an operating state of the internal combustion engine, especially, the amount of fuel injection and the rotation speed. Since the deposit amount calculation unit calculates the accumulation amount of deposit accumulated in the EGR cooler by using, as parameters, the amount of fuel injection and the rotation speed of the internal combustion engine, it is possible to relatively accurately estimate the amount of deposit accumulated in the EGR cooler and to appropriately remove the deposit.

In the condensed water control unit, the condensed water amount calculation unit calculates the retention amount of condensed water retained in the EGR cooler by using, as parameters, the amount of fuel injection and the rotation speed of the internal combustion engine, and the second switching command unit provides a command to perform switching between the first mode and the second mode when the retention amount of condensed water exceeds the second threshold value. Since the inlet and the outlet of the EGR cooler are switched when the retention amount of condensed water retained (remaining) in the EGR cooler exceeds the second threshold value, it is possible to remove the retained condensed water. The amount of condensed water remaining in the EGR cooler changes depending on an operating state of the internal combustion engine, especially the amount of fuel injection and the rotation speed. The condensed water amount calculation unit calculates the retention amount of condensed water retained in the EGR by using, as parameters, the amount of fuel injection and the rotation speed of the internal combustion engine, and it is thus possible to relatively accurately estimate the amount of condensed water retained in the EGR cooler and appropriately remove the condensed water.

Preferably, the control device may be configured to control the switching unit to perform switching between the first mode and the second mode when the first switching command unit provides a command to perform switching between the first mode and the second mode or when the second switching command unit provides a command to perform switching between the first mode and the second mode.

With this configuration, the control device controls the switching unit to perform switching between the first mode and the second mode when the accumulation amount of deposit exceeds the first threshold value or the retention amount of condensed water exceeds the second threshold value, and it is thus possible to remove the deposit or the condensed water at an appropriate timing while the internal combustion engine is operating.

Preferably, the deposit amount calculation unit may be configured to calculate the accumulation amount of deposit accumulated in the EGR cooler in the first mode, the deposit control unit may further include a deposit reset value calculation unit that subtracts the accumulation amount of deposit in the second mode, and the control device may be configured to control the switching unit to perform switching from the first mode to the second mode when the first switching command unit provides a command to perform switching between the first mode and the second mode and control the switching unit to perform switching from the second mode to the first mode when the accumulation amount of deposit calculated by the deposit reset value calculation unit reaches a first reset value or less.

Also, the condensed water amount calculation unit may be configured to calculate the retention amount of condensed water retained in the EGR cooler in the first mode, the condensed water control unit may further include a condensed water reset value calculation unit that subtracts the retention amount of condensed water in the second mode, and the control device may be configured to control the switching unit to perform switching from the first mode to the second mode when the second switching command unit provides a command to perform switching between the first mode and the second mode and control the switching unit to perform switching from the second mode to the first mode when the retention amount of condensed water calculated by the condensed water reset value calculation unit reaches a second reset value or less.

Since the directions of the flow of the EGR gas are different in the first mode and the second mode, cooling efficiency of the EGR cooler can change. With this configuration, the internal combustion engine is operated in the first mode until the accumulation amount of deposit accumulated in the EGR cooler exceeds the first threshold value or the retention amount of condensed water retained in the EGR cooler exceeds the second threshold value. Then, once the accumulation amount of deposit accumulated in the EGR cooler exceeds the first threshold value, or once the retention amount of condensed water retained in the EGR cooler exceeds the second threshold value, switching to the second mode is performed, and the deposit or the condensed water is removed. Since the removal of the deposit or the condensed water progresses in a significantly short period of time as compared with progress of accumulation of the deposit or progress of retention of the condensed water, the accumulation amount of deposit subtracted by the deposit reset value calculation unit reaches the first reset value or less in a short period of time in the second mode, and switching from the second mode to the first mode is performed. Also, the retention amount of condensed water subtracted by the condensed water reset value calculation unit reaches the second reset value or less in a short period of time in the second mode, and switching from the second mode to the first mode is performed in a short period of time. Therefore, the operating time of the internal combustion engine in the second mode is short even when the switching from the first mode to the second mode occurs and the cooling efficiency changes, and it is thus possible to reduce influences thereof.

Preferably, the control device may be configured to be able to communicate with a diagnosis tool, and the control device may be configured to control the switching unit to perform switching between the first mode and the second mode when the diagnosis tool detects that the first switching command unit provides a command to perform switching between the first mode and the second mode or when the diagnosis tool detects that the second switching command unit provides a command to perform switching between the first mode and the second mode.

When the inlet and the outlet of the EGR cooler are switched while the internal combustion engine is operating, an EGR rate can significantly vary at the time of the switching. With this configuration, it is possible to perform switching between the first mode and the second mode by connecting the diagnosis tool capable of communicating with the control device to the control device. Since the inlet and the outlet of the EGR cooler can be switched when the diagnosis tool diagnoses the internal combustion engine, it is possible to curb significant variation in EGR rate when the internal combustion engine is operating.

Preferably, the deposit amount calculation unit may be configured to calculate the accumulation amount of deposit accumulated in the EGR cooler in the first mode, the deposit control unit may further include a deposit reset value calculation unit that subtracts the accumulation amount of deposit in the second mode, and the control device may be configured to control the switching unit to perform switching from the first mode to the second mode when the diagnosis tool detects that the first switching command unit provides a command to perform switching between the first mode and the second mode, and may be configured to control the switching unit to perform switching from the second mode to the first mode when the accumulation amount of deposit calculated by the deposit reset value calculation unit reaches a first reset value or less.

Also, the condensed water amount calculation unit may be configured to calculate the retention amount of condensed water retained in the EGR cooler in the first mode, the condensed water control unit may further include a condensed water reset value calculation unit that subtracts the retention amount of condensed water in the second mode, and the control device may be configured to control the switching unit to perform switching from the first mode to the second mode when the diagnosis tool detects that the second switching command unit provides a command to perform switching between the first mode and the second mode, and may be configured to control the switching unit to perform switching from the second mode to the first mode when the retention amount of condensed water calculated by the condensed water reset value calculation unit reaches a second reset value or less.

With this configuration, it is possible to shorten the operating time of the internal combustion engine in the second mode even when the switching from the first mode to the second mode occurs and the cooling efficiency of the EGR cooler changes, and to reduce influences thereof.

A method for controlling an internal combustion engine according to the present disclosure is a method for controlling an internal combustion engine including an exhaust gas recirculation device that refluxes EGR gas, which is a part of exhaust, to an intake passage. The internal combustion engine includes an EGR cooler that is provided in an EGR passage through which EGR gas flows and that cools EGR gas and a switching unit that switches a direction in which the EGR gas flows between a first mode in which the EGR gas flows through the EGR cooler in a predetermined direction and a second mode in which the EGR gas flows through the EGR cooler in a direction opposite to the predetermined direction. The control method includes: calculating an accumulation amount of deposit accumulated in the EGR cooler by using, as parameters, an amount of fuel injection and a rotation speed of the internal combustion engine; and performing switching between the first mode and the second mode when the accumulation amount of deposit exceeds a first threshold value.

According to the control method, the switching between the first mode and the second mode is performed when the accumulation amount of deposit exceeds the first threshold value, the inlet and the outlet of the EGR cooler are thus switched, and it is possible to remove the accumulated deposit. Since the accumulation amount of deposit accumulated in the EGR cooler is calculated by using, as parameters, the amount of fuel injection and the rotation speed of the internal combustion engine, it is possible to relatively accurately estimate the amount of deposit accumulated in the EGR cooler and to appropriately remove the deposit.

A method for controlling an internal combustion engine according to the present disclosure is a method for controlling an internal combustion engine including an exhaust gas recirculation device that refluxes EGR gas, which is a part of exhaust, to an intake passage. The internal combustion engine includes an EGR cooler that is provided in an EGR passage through which EGR gas flows and that cools the EGR gas and a switching unit that switches a direction in which the EGR gas flows between a first mode in which the EGR gas flows through the EGR cooler in a predetermined direction and a second mode in which the EGR gas flows through the EGR cooler in a direction opposite to the predetermined direction. The control method includes: calculating a retention amount of condensed water retained in the EGR cooler by using, as parameters, an amount of fuel injection and a rotation speed of the internal combustion engine; and performing switching between the first mode and the second mode when the retention amount of condensed water exceeds a second threshold value.

According to the control method, the switching between the first mode and the second mode is performed when the retention amount of condensed water exceeds the second threshold value, the inlet and the outlet of the EGR cooler are switched, and it is possible to remove the condensed water. Since the retention amount of condensed water retained in the EGR cooler is calculated by using, as parameters, the amount of fuel injection and the rotation amount of the internal combustion engine, it is possible to relatively accurately estimate the amount of condensed water retained in the EGR cooler and to appropriately remove the condensed water.

Advantageous Effects of Invention

According to the present disclosure, it is possible to relatively accurately estimate the amount of deposit accumulated in an EGR cooler or the amount of condensed water retained in the EGR cooler and to appropriately remove the deposit or the condensed water.

DESCRIPTION OF EMBODIMENTS

Figure 1:
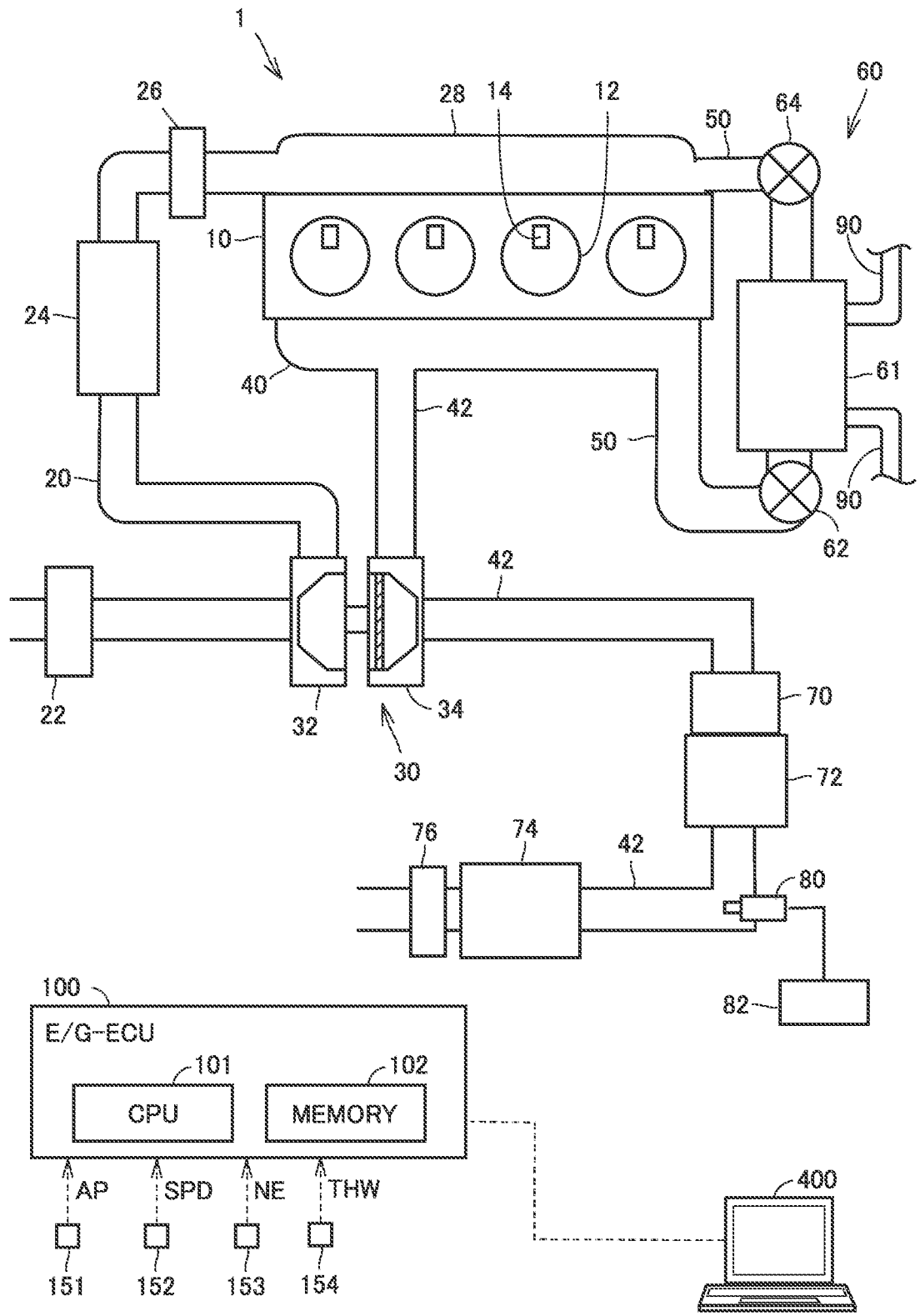
FIG. 1 is an overall configuration diagram of an internal combustion engine according to an embodiment.

Hereinafter, embodiments of the present disclosure will be described in detail with reference to the drawings. Note that the same reference signs are applied to the same or corresponding parts in the drawings and description thereof will not be repeated.

First Embodiment

FIG. 1 is an overall configuration diagram of an internal combustion engine according to an embodiment. An internal combustion engine 1 is a compression self-ignition internal combustion engine (diesel engine), and is an internal combustion engine that injects a fuel from a fuel injection valve (injector) 14 into a fuel chamber formed in a cylinder (air cylinder) 12 of an internal combustion engine main body 10 and performs compression self-ignition. An intake passage 20 of the internal combustion engine 1 is provided with an air cleaner 22, an intercooler 24, and an intake throttle valve (electronically controlled throttle) 26, and fresh air (air) from which foreign matters have been removed by the air cleaner 22 is supercharged (compressed) by a compressor 32 of a turbosupercharger 30, is cooled by the intercooler 24, is supplied to an intake manifold 28, and is supplied from an intake port to each combustion chamber.

Exhaust (exhaust gas) discharged from the combustion chamber is collected by an exhaust manifold 40 and is released to external air via an exhaust passage 42. Also, a part of the exhaust is refluxed to the intake manifold (intake passage) 28 by an exhaust gas recirculation device (EGR) 60. Details of the EGR device 60 will be described later.

The exhaust passage 42 includes a turbine 34 of the turbosupercharger 30, an oxidation catalyst 70, a diesel particulate filter (DPF) 72, a selective reduction catalyst 74, and an oxidation catalyst 76 provided in this order from the upstream side. The oxidation catalyst 70 oxidizes carbon monoxide (CO) in exhaust into carbon dioxide ($CO_2$) and oxidizes hydrocarbon (HC) in exhaust into water ($H_2O$) and $CO_2$. Additionally, the oxidation catalyst 70 oxidizes nitrogen monoxide (NO) in exhaust into nitrogen dioxide ($NO_2$). This is for oxidizing NO in exhaust into $NO_2$ and causing the ratio between NO and $NO_2$ to approach 1:1 because a reduction reaction of nitrogen oxides (NOx) has a high reaction speed when NO and $NO_2$ are contained at the ratio of 1:1 and exhaust of the diesel internal combustion engine contains more NO.

The DPF 72 performs purification by capturing fine particles in the exhaust and appropriately burning and removing the captured fine particles. The selective reduction catalyst (hereinafter, also referred to as a selective catalytic reduction (SCR) catalyst) 74 reduces and purifies NOx in the exhaust. Details of the SCR catalyst 74 will be described later. The oxidation catalyst 76 oxidizes ammonia discharged (slipped) from the SCR catalyst 74 and performs purification.

The SCR catalyst 74 is obtained by carrying copper (Cu) ion-exchanged zeolite as a catalyst on a ceramic carrier and exhibits a high purification rate by using ammonia ($NH_3$) as a reducing agent. Ammonia used as a reducing agent is generated by hydrolyzing urea water supplied to the exhaust passage 42 on the upstream side of the SCR catalyst 74. The exhaust passage on the upstream side of the SCR catalyst 74 is provided with a urea supplementation valve (urea water injection injector) 80, and urea water pumped by a pump, which is not illustrated, from a urea water tank 82 is injected from the urea supplementation valve 80 to the exhaust passage 42 on the upstream side of the SCR catalyst 74.

Figure 2:
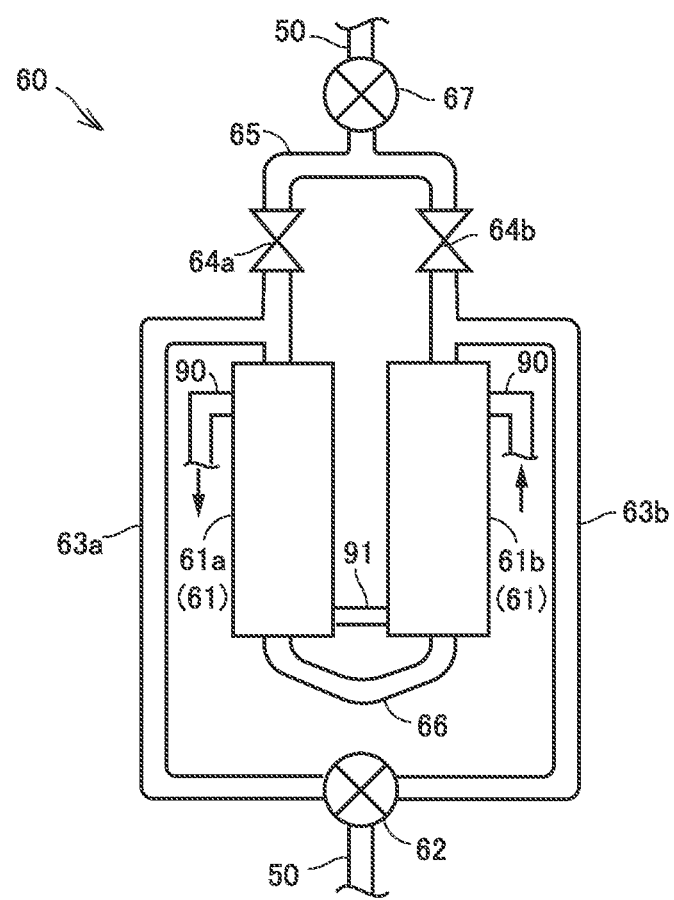
FIG. 2 is a diagram illustrating a configuration of an EGR device 60.

FIG. 2 is a diagram illustrating a configuration of the EGR device 60. The EGR device 60 is provided in an EGR passage 50 that establishes communication between the exhaust manifold 40 and the intake manifold 28. EGR gas, which is a part of the exhaust, flows through the EGR passage 50. A switching valve 62 is provided on the upstream side of the EGR passage 50 connected to the exhaust manifold 40. The EGR passage 50 is branched into a first branch passage 63a and a second branch passage 63b at the switching valve 62 as a junction. The switching valve 62 may be, for example, a three-way valve. The downstream side of the first branch passage 63a is connected to a gathering passage 65 via an opening/closing valve 64a. The downstream side of the second branch passage 63b is connected to the gathering passage 65 via an opening/closing valve 64b. The downstream side of the gathering passage 65 is connected to the EGR passage 50 via an EGR valve 67, and EGR gas is refluxed to the intake manifold 28. It is possible to control the EGR rate (EGR amount) by adjusting an opening degree of the EGR valve 67.

The downstream side of the first branch passage 63a is connected to one side of a first EGR cooler 61a. The downstream side of the second branch passage 63b is connected to one side of a second EGR cooler 61b. The other side of the first EGR cooler 61a and the other side of the second EGR cooler 61b are connected to each other by a connection passage 66. The first EGR cooler 61a and the second EGR cooler 61b have substantially the same configurations, heat exchange is performed between EGR gas and cooling water by the EGR gas flowing between cooling fins with a honeycomb structure formed in a flat cooling water pipe, through which the cooling water flows, for example, and the EGR gas is thereby cooled. In the present embodiment, the other side of the first EGR cooler 61a and the other side of the second EGR cooler 61b are connected by the connection passage 66 and thereby to form an EGR cooler 61.

A cooling water passage 90 is connected to the EGR cooler 61. The cooling water flows in from one side of the second EGR cooler 61b and flows out from the one side of the first EGR cooler 61a, as illustrated by the arrow in FIG. 2. The other side of the first EGR cooler 61a and the other side of the second EGR cooler 61b are provided with a cooling water connection passage 91 and are configured such that the cooling water flows from the second EGR cooler 61b to the first EGR cooler 61a.

Figure 3:
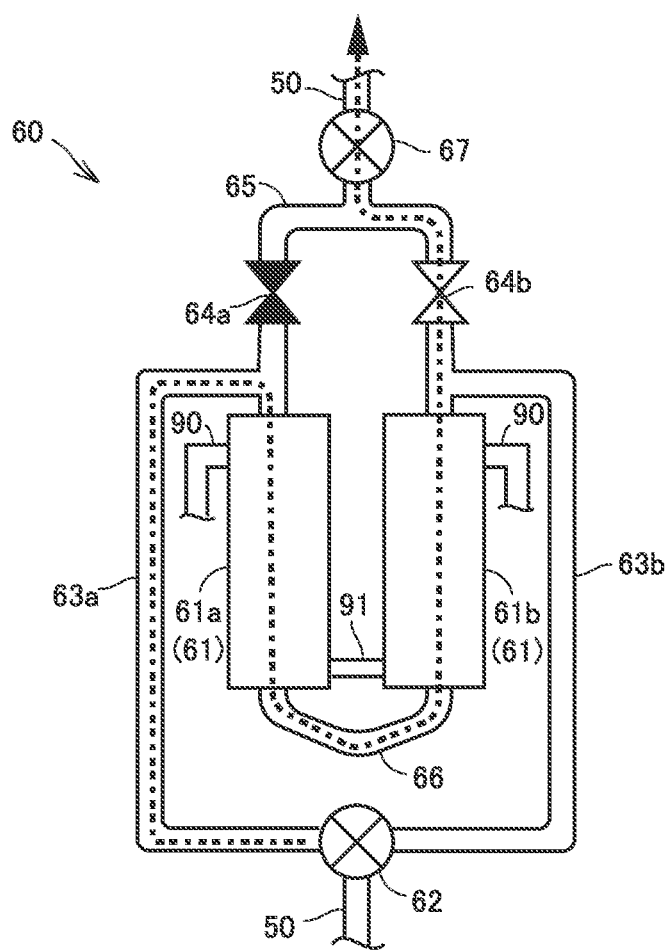
FIG. 3 is a diagram for explaining a first mode of the EGR device 60.

FIG. 3 is a diagram for explaining a first mode of the EGR device 60. In the first mode, the EGR passage 50 communicates with the first branch passage 63a, and the switching valve 62 is switched to block communication between the EGR passage 50 and the second branch passage 63b. Also, the opening/closing valve 64a is closed, and the opening/closing valve 64b is opened. Then, the EGR gas flows through the first branch passage 63a, flows in from the one side of the first EGR cooler 61a, flows out from the one side of the second EGR cooler 61b, and flows into the intake manifold 28 via the EGR valve 67 as illustrated by the dashed-line arrow in FIG. 3. In the first mode, the one side of the first EGR cooler 61a corresponds to an inlet of the EGR cooler 61, while the one side of the second EGR cooler 61b corresponds to an outlet of the EGR cooler 61.

Figure 4:
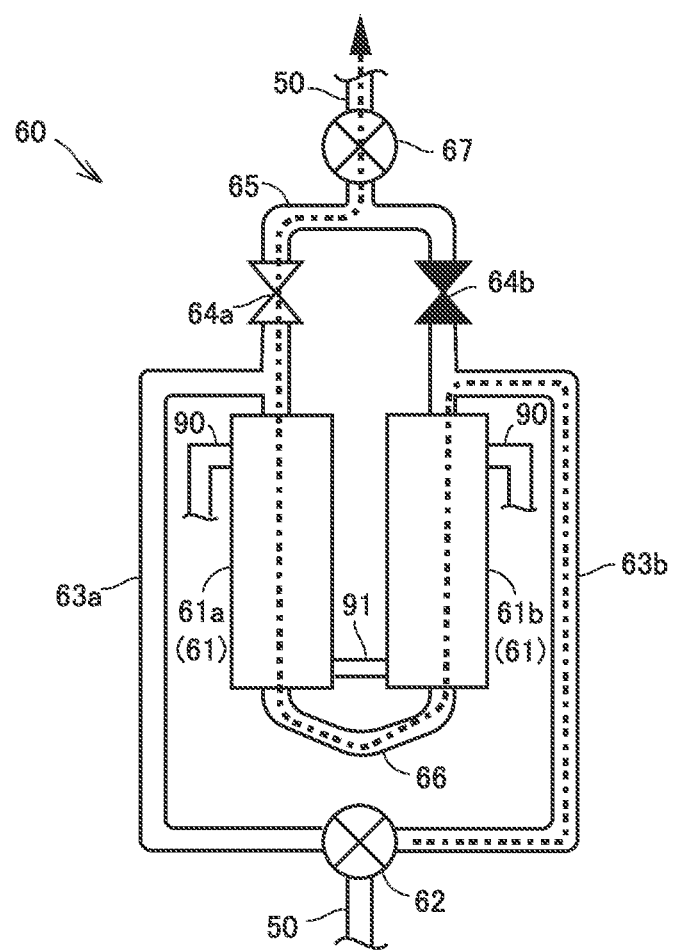
FIG. 4 is a diagram for explaining a second mode of the EGR device 60.

FIG. 4 is a diagram for explaining a second mode of the EGR device 60. In the second mode, the EGR passage 50 communicates with the second branch passage 63b and switches the switching valve 62 to block the communication between the EGR passage 50 and the first branch passage 63a. Also, the opening/closing valve 64b is closed, and the opening/closing valve 64a is opened. Then, the EGR gas flows through the second branch passage 63b, flows in from the one side of the second EGR cooler 61b, flows out from the one side of the first EGR cooler 61a, and flows into the intake manifold 28 via the EGR valve 67 as illustrated by the dashed-line arrow in FIG. 4. In the second mode, the one side of the second EGR cooler 61b corresponds to the inlet of the EGR cooler 61, while the one side of the first EGR cooler 61a corresponds to the outlet of the EGR cooler 61.

Figure 5:
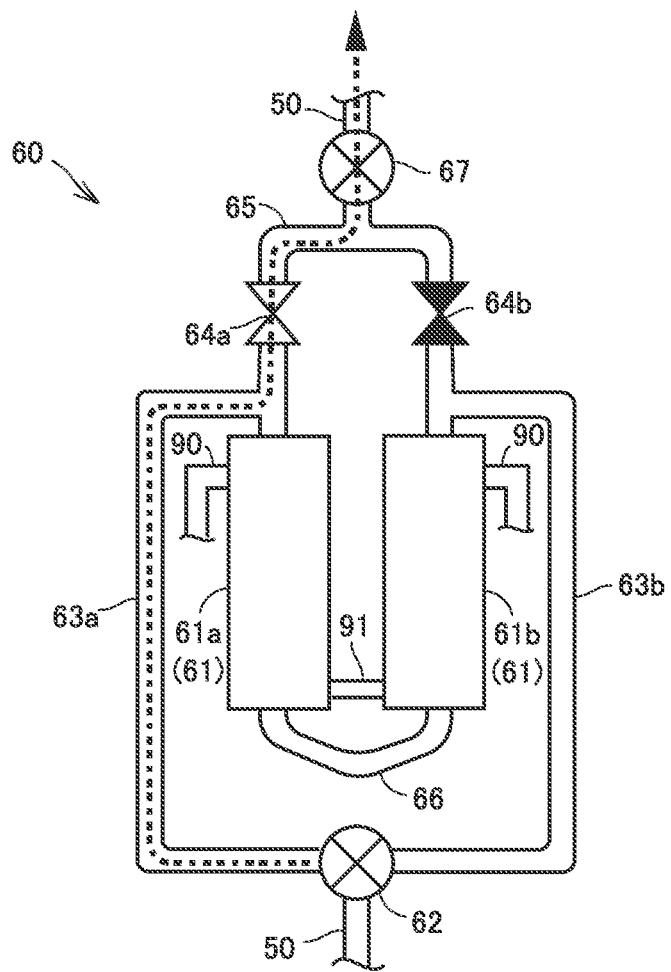
FIG. 5 is a diagram for explaining a bypass mode in which an EGR cooler 61 is bypassed when the EGR device 60 is operated in the first mode.

FIG. 5 is a diagram for explaining a bypass mode in which the EGR cooler 61 is bypassed when the EGR device 60 is operated in the first mode. The opening/closing valve 64b is closed, and the opening/closing valve 64a is opened during operation in the first mode illustrated in FIG. 3. Then, the EGR gas bypasses the EGR cooler 61 without flowing into the EGR cooler 61 and flows into the intake manifold 28 via the EGR valve 67 as illustrated by the dashed-line arrow in FIG. 5. Note that the opening/closing valve 64b may be opened.

Figure 6:
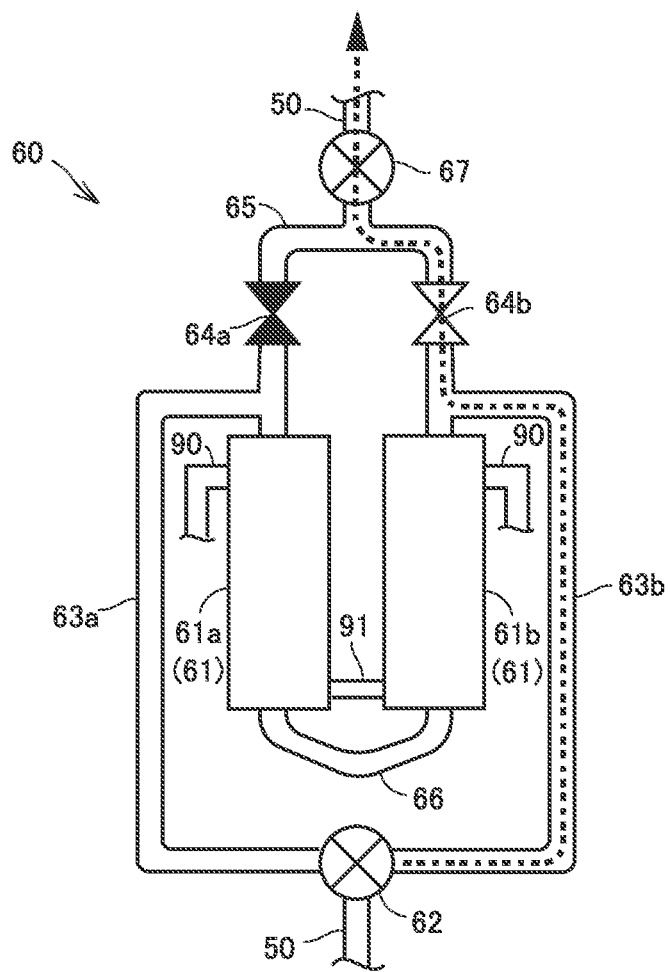
FIG. 6 is a diagram for explaining a bypass mode in which the EGR cooler 61 is bypassed when the EGR device 60 is operated in the second mode.

FIG. 6 is a diagram for explaining a bypass mode in which the EGR cooler 61 is bypassed when the EGR device 60 is operated in the second mode. The opening/closing valve 64a is closed, and the opening/closing valve 64b is opened during operation in the second mode illustrated in FIG. 4. Then, the EGR gas bypasses the EGR cooler 61 without flowing into the EGR cooler 61 and flows into the intake manifold 28 via the EGR valve 67. Note that the opening/closing valve 64a may be opened.

The internal combustion engine 1 includes an electronic control unit (E/G-ECU) 100 as a control device. The E/G-ECU 100 includes a central processing unit (CPU) 101, a memory 102 composed of a read only memory (ROM) that stores a processing program and the like, a random access memory (RAM) that temporarily stores data, and the like, an input/output port (not illustrated) for inputting and outputting various signals, and the like and executes predetermined arithmetic processing on the basis of information stored in the memory 102 and information from various sensors. Then, the E/G-ECU 100 controls the internal combustion engine 1 on the basis of a result of the arithmetic processing. In a case where the internal combustion engine 1 is used as a power source of a vehicle, for example, a required torque is calculated from an accelerator position AP detected by an accelerator position sensor 151 and a vehicle speed SPD detected by a vehicle speed sensor 152, an amount of fuel injection Fq and a fuel injection timing that allow a torque matching the required torque to be output from the internal combustion engine 1 are determined, and the amount of fuel injection and the fuel injection timing are controlled.

Also, the E/G-ECU 100 controls the EGR device 60 of the internal combustion engine 1. For example, a target EGR rate is calculated from the amount of fuel injection Fq and the engine rotation speed NE detected by an engine rotation speed sensor 153, and the opening degree of the EGR valve 67 is controlled to achieve the target EGR rate. In addition, whether or not to cool the EGR gas by the EGR cooler 61 is determined on the basis of a cooling water temperature THW detected by an engine cooling water temperature sensor 154. In a case where the cooling water temperature THW is lower than a preset temperature, for example, the EGR gas is refluxed to the intake manifold 28 without cooling the EGR gas by the EGR cooler 61. In this case, the EGR gas flows into the intake manifold 28 in the bypass mode illustrated in FIG. 5 or FIG. 6. In a case where the cooling water temperature THW is higher than the preset temperature, the EGR gas is cooled by the EGR cooler 61. Note that refluxing of the EGR gas cooled by the EGR cooler 61 is also referred to as cool EGR.

In the cool EGR, the EGR gas flows into the intake manifold 28 in the first mode illustrated in FIG. 3 or in the second mode illustrated in FIG. 4. Once the EGR gas is cooled by the EGR cooler 61, the EGR gas loses thermal energy, and kinetic energy thus decreases. Also, when the EGR gas is cooled, condensed water and oil mist contained in the EGR gas (exhaust) are joined to soot in the EGR gas and generate foreign matters (deposit). Therefore, deposit is accumulated in the vicinity of the outlet of the EGR cooler 61 where the flow rate of the EGR gas decreases to the lowest flow rate. The deposit is accumulated on the one side of the second EGR cooler 61b in the case of the first mode, while the deposit is accumulated on the one side of the first EGR cooler 61a in the case of the second mode. When a large amount of deposit is accumulated in the EGR cooler 61, there is a likelihood that a desired NOx reduction effect and a desired fuel efficiency effect cannot be obtained due to clogging or degradation of cooling efficiency of the EGR cooler 61.

In the cool EGR, the temperature on the outlet side of the EGR cooler 61 is low, and condensed water retained on the outlet side of the EGR cooler is not evaporated and remains. Since the condensed water shows strong acidity, there is a concern that the remaining condensed water may cause corrosion of the EGR cooler 61.

In the present embodiment, the accumulated deposit and retained condensed water are removed by switching the inlet and the outlet of the EGR cooler 61. It is possible to switch the inlet and the outlet of the EGR cooler 61 by performing switching from the first mode to the second mode or by performing switching from the second mode to the first mode. The outlet side on which the deposit has been accumulated and the outlet side on which the condensed water has been retained serve as an inlet of the EGR cooler 61 by switching the inlet and the outlet of the EGR cooler 61. Since the flow rate of the EGR gas is high on the inlet side of the EGR cooler 61, the accumulated deposit peels off and is removed from the cooling fins and the like. Since the temperature of the EGR gas is high (high temperature) on the inlet side of the EGR cooler 61, the viscosity of the accumulated deposit decreases, and the deposit is likely to peel off. Moreover, since the temperature of the EGR gas is high (high temperature) on the inlet side of the EGR cooler 61, the temperature on the inlet side of the EGR cooler 61 becomes high, and the remaining condensed water is heated, evaporated, and removed.

In the present embodiment, the accumulation amount $\Sigma Dp$ of deposit accumulated in the EGR cooler 61 is calculated by using, as parameters, the amount of fuel injection Fq and the engine rotation speed NE of the internal combustion engine 1. The inlet and the outlet of the EGR cooler 61 are switched when the accumulation amount $\Sigma Dp$ of deposit reaches a first threshold value $\alpha$ or more. Also, the retention amount $\Sigma Cw$ of condensed water retained in the EGR cooler 61 is calculated by using, as parameters, the amount of fuel injection Fq and the engine rotation speed NE of the internal combustion engine 1. The inlet and the outlet of the EGR cooler 61 are switched when the retention amount $\Sigma Cw$ of condensed water reaches a second threshold value $\beta$ or more.

The accumulation amount $\Sigma Dp$ of deposit accumulated in the EGR cooler 61 and the retention amount $\Sigma Cw$ of condensed water retained in the EGR cooler 61 change depending on the operating state of the internal combustion engine 1, especially, the amount of fuel injection Fq and the engine rotation speed NE. The accumulation amount $\Sigma Dp$ of deposit and the retention amount $\Sigma Cw$ of condensed water are calculated by using, as parameters, the amount of fuel injection Fq and the engine rotation speed NE, and it is thus possible to relatively accurately estimate the accumulation amount $\Sigma Dp$ of deposit accumulated in the EGR cooler 61 and the retention amount $\Sigma Cw$ of condensed water retained in the EGR cooler 61 and to appropriately remove the deposit and the condensed water.

Figure 7:
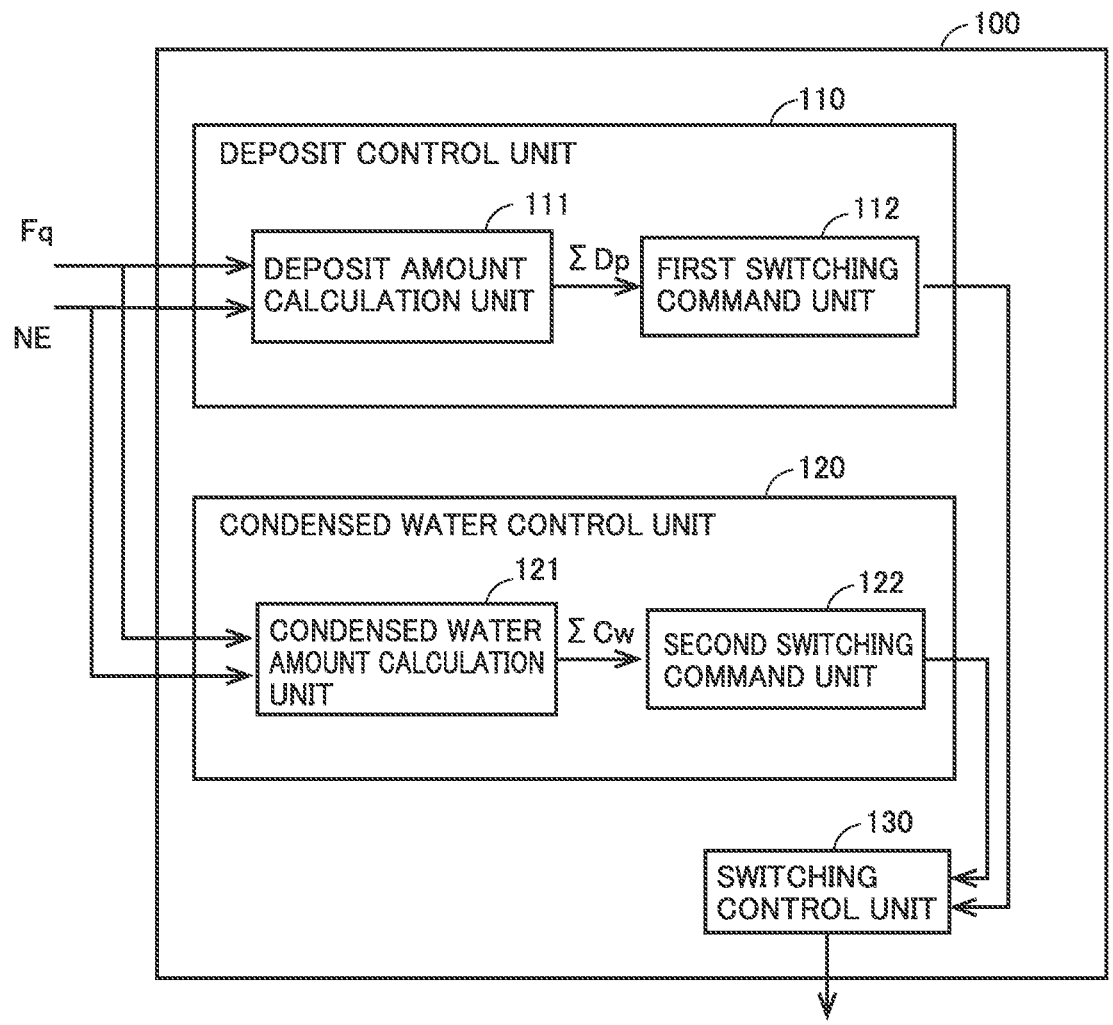
FIG. 7 is a diagram illustrating functional blocks configured in an E/G-ECU 100.

FIG. 7 is a diagram illustrating functional blocks configured in the E/G-ECU 100. A deposit control unit 110 includes a deposit amount calculation unit 111 and a first switching command unit 112. The deposit amount calculation unit 111 calculates the accumulation amount $\Sigma Dp$ of deposit from the amount of fuel injection Fq and the engine rotation speed NE and outputs the calculated accumulation amount $\Sigma Dp$ of deposit to the first switching command unit 112. Note that a method for calculating the accumulation amount $\Sigma Dp$ of deposit will be described later. The first switching command unit 112 compares the accumulation amount $\Sigma Dp$ of deposit with the first threshold value $\alpha$, and when the accumulation amount $\Sigma Dp$ of deposit is the first threshold value $\alpha$ or more, the first switching command unit 112 provides a switching command to a switching control unit 130 to switch the first mode and the second mode and switch the inlet and the outlet of the EGR cooler 61.

A condensed water control unit 120 includes a condensed water amount calculation unit 121 and a second switching command unit 122. The condensed water amount calculation unit 121 calculates the retention amount $\Sigma Cw$ of condensed water from the amount of fuel injection Fq and the engine rotation speed NE and outputs the calculated retention amount $\Sigma Cw$ of condensed water to the second switching command unit 122. Note that a method for calculating the retention amount $\Sigma Cw$ of condensed water will be described later. The second switching command unit 122 compares the retention amount $\Sigma Cw$ of condensed water with the second threshold value $\beta$, and when the retention amount $\Sigma Cw$ of condensed water is the second threshold value $\beta$ or more, the second switching command unit 122 provides a switching command to the switching control unit 130 to switch the first mode and the second mode and switch the inlet and the outlet of the EGR cooler 61.

Once the switching control unit 130 receives the switching command, the switching control unit 130 controls the switching valve 62, the opening/closing valve 64a, and the opening/closing valve 64b, and switches the first mode and the second mode.

Figure 8:
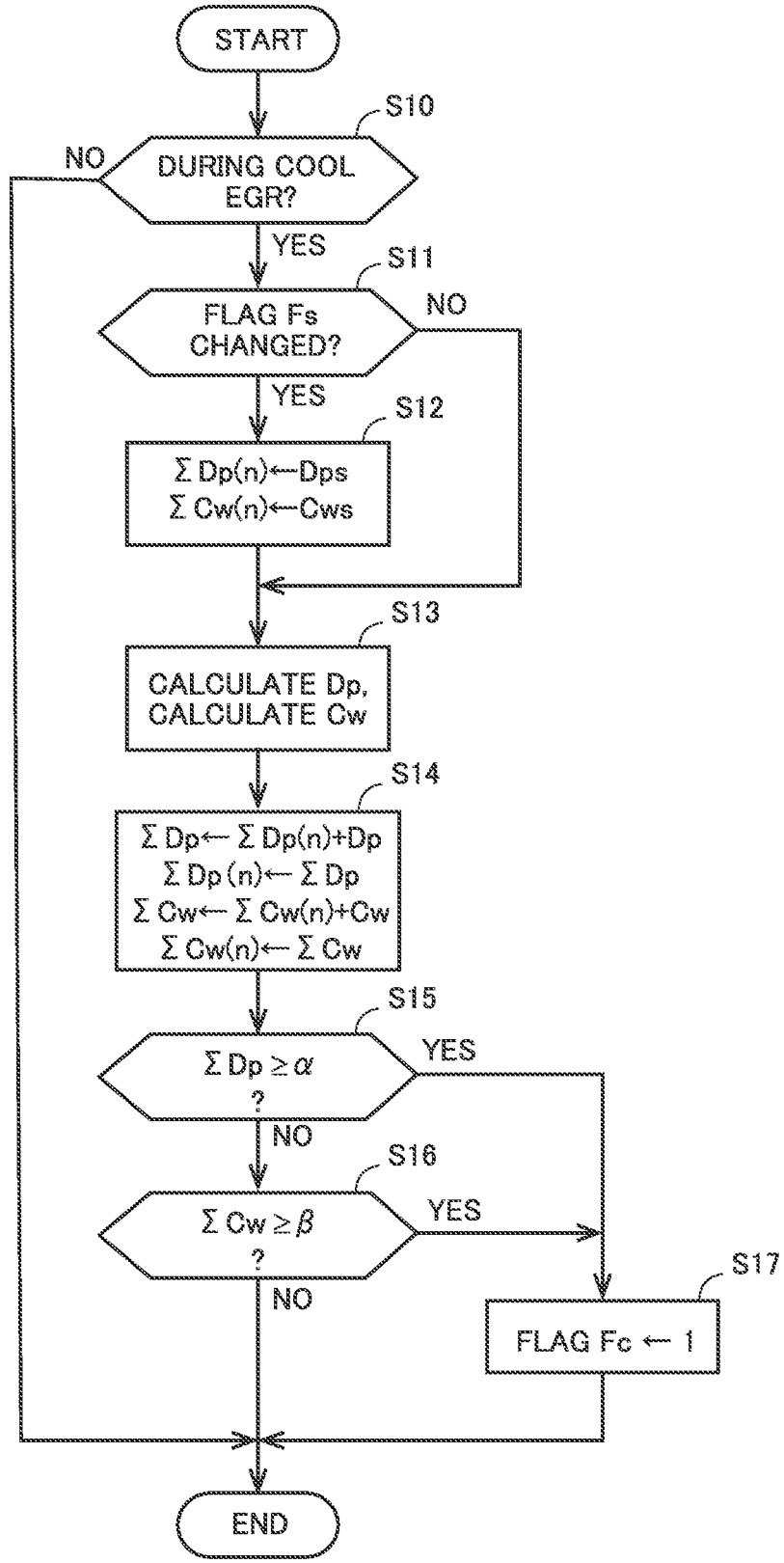
FIG. 8 is a flowchart illustrating processing of deposit/condensed water control executed by the E/G-ECU 100.

FIG. 8 is a flowchart illustrating processing of deposit/condensed water control executed by the E/G-ECU 100. The flowchart is repeatedly executed every predetermined period during while the internal combustion engine 1 is working (operating). In Step (hereinafter, Step will be abbreviated as S) 10, whether or not the cool EGR is working is determined. When the EGR gas cooled by the EGR cooler 61 is refluxed to the intake manifold 28 and the cool EGR is working, positive determination is made, and the processing proceeds to S11. In a case where the EGR gas is refluxed to the intake manifold 28 without cooling the EGR gas in the bypass mode, or in a case where the refluxing of the EGR gas is stopped, negative determination is made, and this routing is ended.

In S11, whether or not a flag Fs has changed is determined. The flag Fs is a flag set by mode switching control, which will be described later. The flag Fs is set to 0 in the first mode, and the flag Fs is set to 1 in the second mode. In a case where switching between the first mode and the second mode is not performed after a previous routine is processed and before this routine is processed, the flag Fs does not change, negative determination is thus made, and the processing proceeds to S13. When switching between the first mode and the second mode is executed by the mode switching control after the previous routine is processed and before this routine is processed, the flag Fs changes, positive determination is thus made, and the processing proceeds to S12.

In S12, a previous value $\Sigma Dp(n)$ of the accumulation amount of deposit is set to (overwritten as) a reset value Dps, a previous value $\Sigma Cw(n)$ of the retention amount of condensed water is set to (overwritten as) a reset value Cws, and the processing proceeds to S13.

Figure 9:
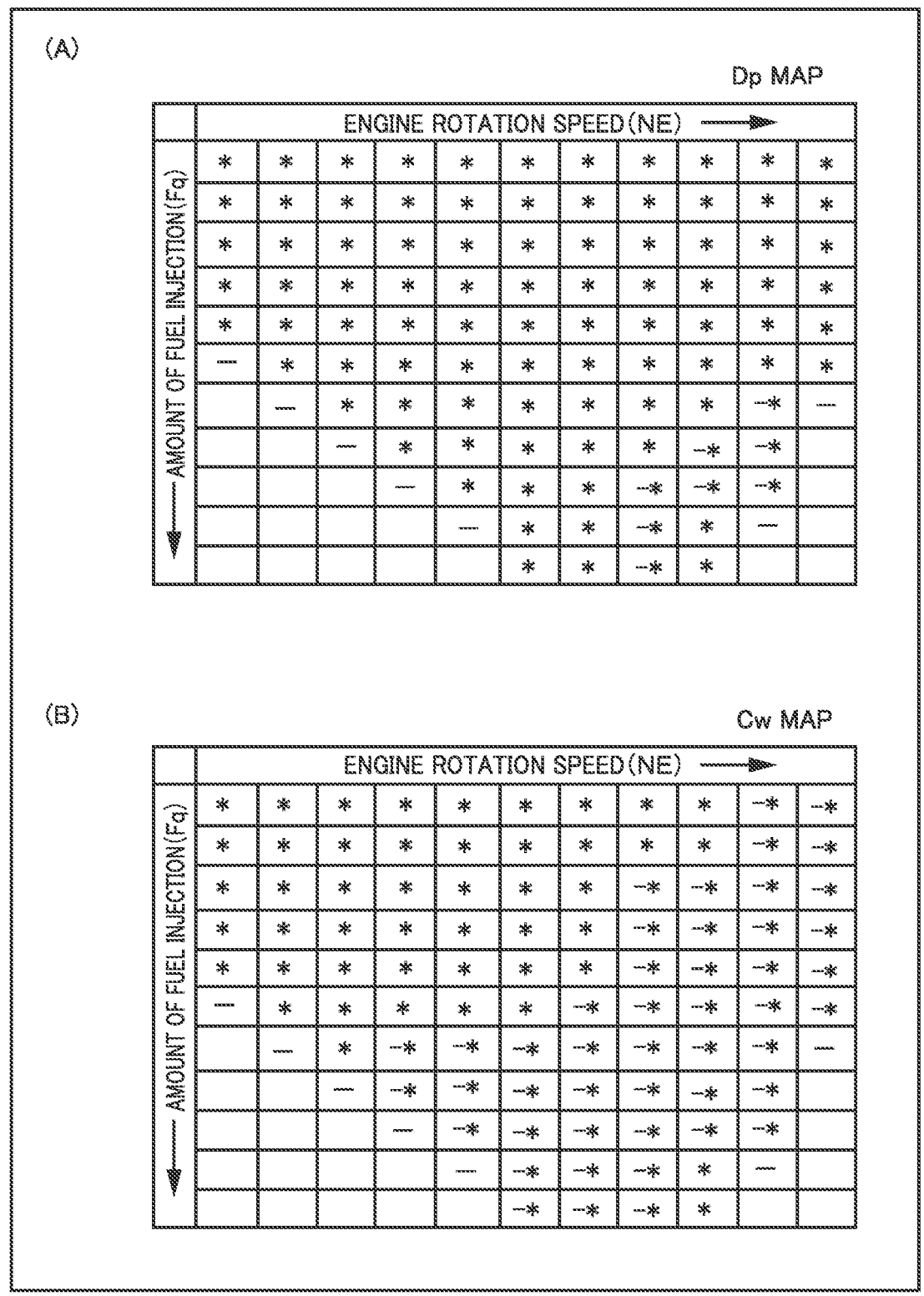
FIG. 9 is a diagram illustrating a deposit amount Dp map and a condensed water amount Cw map stored in a memory 102.

In S13, the amount Dp of deposit accumulated in the EGR cooler 61 and the amount Cw of condensed water retained in the EGR cooler 61 are calculated on the basis of the amount of fuel injection Fq and the engine rotation speed NE. FIG. 9 is a diagram illustrating a deposit amount Dp map and a condensed water amount Cw map stored in the memory 102. FIG. 9(A) is a deposit amount Dp map, and FIG. 9(B) is a condensed water amount Cw map.

In FIG. 9, the horizontal axis represents the engine rotation speed NE of the internal combustion engine 1, and the vertical axis represents the amount of fuel injection Fq of the internal combustion engine 1. In the deposit amount Dp map (FIG. 9(A)), "*" represents the amount of deposit accumulated per unit time, and each "*" is a different numerical value. Also, "−*" represents the amount by which the accumulated deposit is removed. When the internal combustion engine 1 is operated with a high load and at a high rotation speed, the amount of EGR gas flowing through the EGR cooler 61 increases, and an operating region where the accumulated deposit is removed is also present. In the condensed water amount Cw map (FIG. 9(B)), "*" represents the amount of condensed water retained per unit time, and each "*" is a different numerical value. Also, "−*" represents the amount by which the retained condensed water is removed. When the internal combustion engine 1 is operated with a high load and at a high rotation speed, the temperature of the EGR gas flowing through the EGR cooler 61 rises, and an operating region where the accumulated condensed water is removed is also present.

The amount of deposit accumulated per unit time, the amount of condensed water retained per unit time, and the like are determined in advance by experiments or the like, and the deposit amount Dp map and the condensed water amount Cw map are created. Also, the created deposit amount Dp map and the condensed water amount Cw map are stored in the memory 102.

In S13, the amount (*,−*) of deposit accumulated per unit time is determined from the deposit amount Dp map by using, as parameters, the amount of fuel injection Fq and the engine rotation speed NE, and a value corresponding to an arithmetic operation cycle (predetermined period) of this routine is calculated as the amount Dp of deposit. Also, the amount (*,−*) of condensed water retained per unit time is determined from the condensed water amount Cw map by using, as parameters, the amount of fuel injection Fq and the engine rotation speed NE, and a value corresponding to an arithmetic operation cycle of this routine is calculated as the amount Cw of condensed water.

In subsequent S14, the previous value $\Sigma Dp(n)$ of the accumulation amount of deposit is read from the memory 102, the amount Dp of deposit is added to the previous value $\Sigma Dp(n)$, and the accumulation amount $\Sigma Dp$ of the deposit is thereby calculated ($\Sigma Dp=\Sigma Dp(n)+Dp$). Then, the calculated accumulation amount $\Sigma Dp$ of deposit is stored (overwritten) as the previous value $\Sigma Dp(n)$ in the memory 102.

Also, in S14, the previous value $\Sigma Cw(n)$ of the retention value of condensed water is read from the memory 102, the amount Cw of condensed water is added to the previous value $\Sigma Cw(n)$, and the retention amount $\Sigma Cw$ of condensed water is thereby calculated ($\Sigma Cw=\Sigma Cw(n)+Cw$). Then, the calculated retention amount $\Sigma Cw$ of condensed water is stored (overwritten) as the previous value $\Sigma Cw(n)$ in the memory 102, and the processing proceeds to S15.

In S15, whether or not the accumulation amount $\Sigma Dp$ of deposit is the first threshold value $\alpha$ or more is determined. In a case where the accumulation amount $\Sigma Dp$ of deposit is smaller than the first threshold value $\alpha$ ($\Sigma Dp<\alpha$), negative determination is made, and the processing proceeds to S16. In a case where the accumulation amount $\Sigma Dp$ of deposit is the first threshold value $\alpha$ or more ($\Sigma Dp\geq\alpha$), positive determination is made, and the processing proceeds to S17. The first threshold value $\alpha$ is, for example, such a value that cooling efficiency of the EGR cooler 61 becomes less than an allowable value when the deposit is accumulated in the EGR cooler 61 at and above this value, and is determined in advanced by experiments or the like.

In S16, whether or not the retention amount $\Sigma Cw$ of condensed water is the second threshold value $\beta$ or more is determined. In a case where the retention amount $\Sigma Cw$ of condensed water is smaller than the second threshold value $\beta$ ($\Sigma Cw<\beta$), negative determination is made, and this routine is ended. In a case where the retention amount $\Sigma Cw$ of condensed water is the second threshold value $\beta$ or more ($\Sigma Cw\geq\beta$), positive determination is made, and the processing proceeds to S17. The second threshold value $\beta$ is, for example, such a value that corrosion of the EGR cooler 61 relatively quickly progresses when condensed water remains in the EGR cooler 61 at or above this value, and is determined in advance by experiments or the like.

In S17, the flag Fc is set to 1, and this routine is ended. The flag Fc is a flag for providing a command for switching between the first mode and the second mode and serves as a switching command when the flag Fc is set to 1 (Fc=1).

Figure 10:
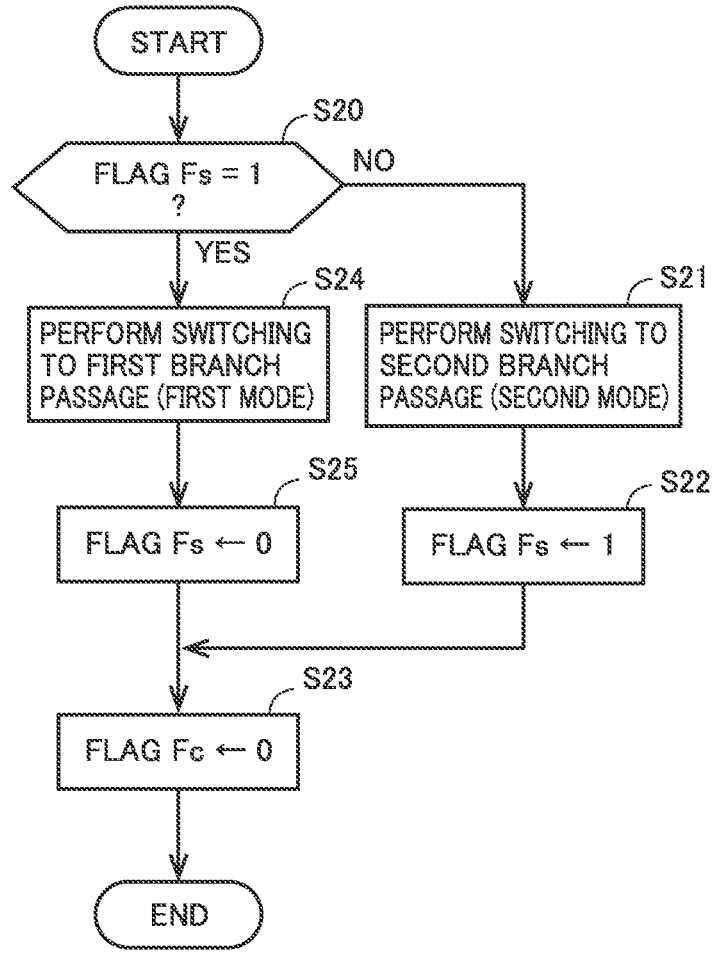
FIG. 10 is a flowchart illustrating processing of mode switching control executed by the E/G-ECU 100.

FIG. 10 is a flowchart illustrating processing of mode switching control executed by the E/G-ECU 100. Interruption processing of this flowchart is performed when the flag Fc is set to 1. Once the flag Fc is set to 1 in S17 in FIG. 8, and interruption processing of the mode switching control is performed, whether or not the flag Fs is 1 is determined in S20. In a case where the current state of the EGR device 60 is the first mode, the flag Fs is 0, negative determination is thus made in S20, and the processing proceeds to S21.

In S21, the switching valve 62 is switched such that the EGR passage 50 communicates with the second branch passage 63b and communication between the EGR passage 50 and the first branch passage 63a is blocked. Also, the opening/closing valve 64b is closed, the opening/closing valve 64a is opened, the EGR device 60 is switched to the second mode (see FIG. 4), and the processing then proceeds to S22.

In S22, the flag Fs is set to 1, the processing then proceeds to S23, the flag Fc is set to 0, and this routine is ended.

In S20, in a case where the current state of the EGR device 60 is in the second mode, the flag Fs is 1, positive determination is thus made, and the processing proceeds to S24.

In S24, the switching valve 62 is switched such that the EGR passage 50 communicates with the first branch passage 63a and communication between the EGR passage 50 and the second branch passage 63b is blocked. Also, the opening/closing valve 64a is closed, the opening/closing valve 64b is opened, the EGR device 60 is switched to the first mode (see FIG. 3), and the processing then proceeds to S25.

In S25, the flag Fs is set to 0, the processing then proceeds to S23, the flag Fc is set to 0, and this routine is ended.

In the present embodiment, the processing in FIG. 8 corresponds to the deposit control unit 110, the processing in S13 and S14 corresponds to the deposit amount calculation unit 111, and the processing in S15 and S17 corresponds to the first switching command unit 112. The processing in FIG. 8 corresponds to the condensed water control unit 120, the processing in S13 and S14 corresponds to the condensed water amount calculation unit 121, and the processing in S15 and S17 corresponds to the second switching command unit 122. Also, the processing in FIG. 10 corresponds to the switching control unit 130.

According to the present embodiment, in the deposit control unit 110, the deposit amount calculation unit 111 calculates the accumulation amount $\Sigma Dp$ of deposit accumulated in the EGR cooler by using, ad parameters, the amount of fuel injection Fq and the engine rotation speed NE of the internal combustion engine, and when the accumulation amount ΣDp of deposit exceeds the first threshold value α, the first switching command unit 112 provides a command to perform switching between the first mode and the second mode. Then, the switching control unit 130 controls the switching unit (the switching valve 62, the opening/closing valve 64a, and the opening/closing valve 64b), switching between the first mode in which the EGR gas flows through the EGR cooler 61 in the predetermined direction and the second mode in which the EGR gas flows through the EGR cooler 61 in a direction opposite to the predetermined direction is switched, and the inlet and the outlet of the EGR cooler 61 are thereby switched.

The outlet side on which the deposit is accumulated is the inlet of the EGR cooler 61 by switching the inlet and the outlet of the EGR cooler 61. Since the flow rate of the EGR gas is high on the inlet side of the EGR cooler 61, the accumulated deposit peels off and is removed from the cooling fins and the like. Also, since the accumulation amount ΣDp of deposit is calculated by using, as parameters, the amount of fuel injection Fq and the engine rotation speed NE, it is possible to relatively accurately estimate the accumulation amount ΣDp of deposit accumulated in the EGR cooler 61 and to appropriately remove the deposit.

According to the present embodiment, in the condensed water control unit 120, the condensed water amount calculation unit 121 calculates the retention amount ΣCw of condensed water retained in the EGR cooler 61 by using, as parameters, the amount of fuel injection Fq and the engine rotation speed NE of the internal combustion engine, and when the retention amount ΣCw of condensed water exceeds the second threshold value β, the second switching command unit 122 provides a command to perform switching between the first mode and the second mode. Also, the switching control unit 130 controls the switching unit (the switching valve 62, the opening/closing valve 64a, and the opening/closing valve 64b), and the inlet and the outlet of the EGR cooler 61 are switched by performing switching between the first mode in which the EGR gas flows through the EGR cooler 61 in the predetermined direction and the second mode in which the EGR gas flows through the EGR cooler 61 in the direction opposite to the predetermined direction.

The outlet side on which the condensed water is retained becomes the inlet of the EGR cooler 61 by switching the inlet and the outlet of the EGR cooler 61. Since the temperature of the EGR gas is high on the inlet side of the EGR cooler 61, the remaining condensed water is evaporated (volatilized) and removed. Also, since the retention amount ΣCw of condensed water is calculated by using, as parameters, the amount of fuel injection Fq and the engine rotation speed NE, it is possible to relatively accurately estimate the retention amount ΣCw of condensed water retained in the EGR cooler 61 and to appropriately remove the condensed water.

Although the deposit control unit 110 and the condensed water control unit 120 are configured in the E/G-ECU 100 in the present embodiment, at least one of the deposit control unit 110 and the condensed water control unit 120 may be configured in the E/G-ECU 100.

Second Embodiment

In the above embodiment (first embodiment), the switching control unit 130 performs switching between the first mode and the second mode. However, a diagnosis tool may be used to perform switching between the first mode and the second mode.

In FIG. 1, the E/G-ECU 100 is configured to be able to communicate with a diagnosis tool 400. The diagnosis tool 400 is adapted to diagnose abnormality and a failure of the internal combustion engine 1. In a case where the internal combustion engine 1 is mounted as a power source in a vehicle, for example, the diagnosis tool 400 may be a scanning tool of an on-board diagnostics (OBD).

Figure 11:
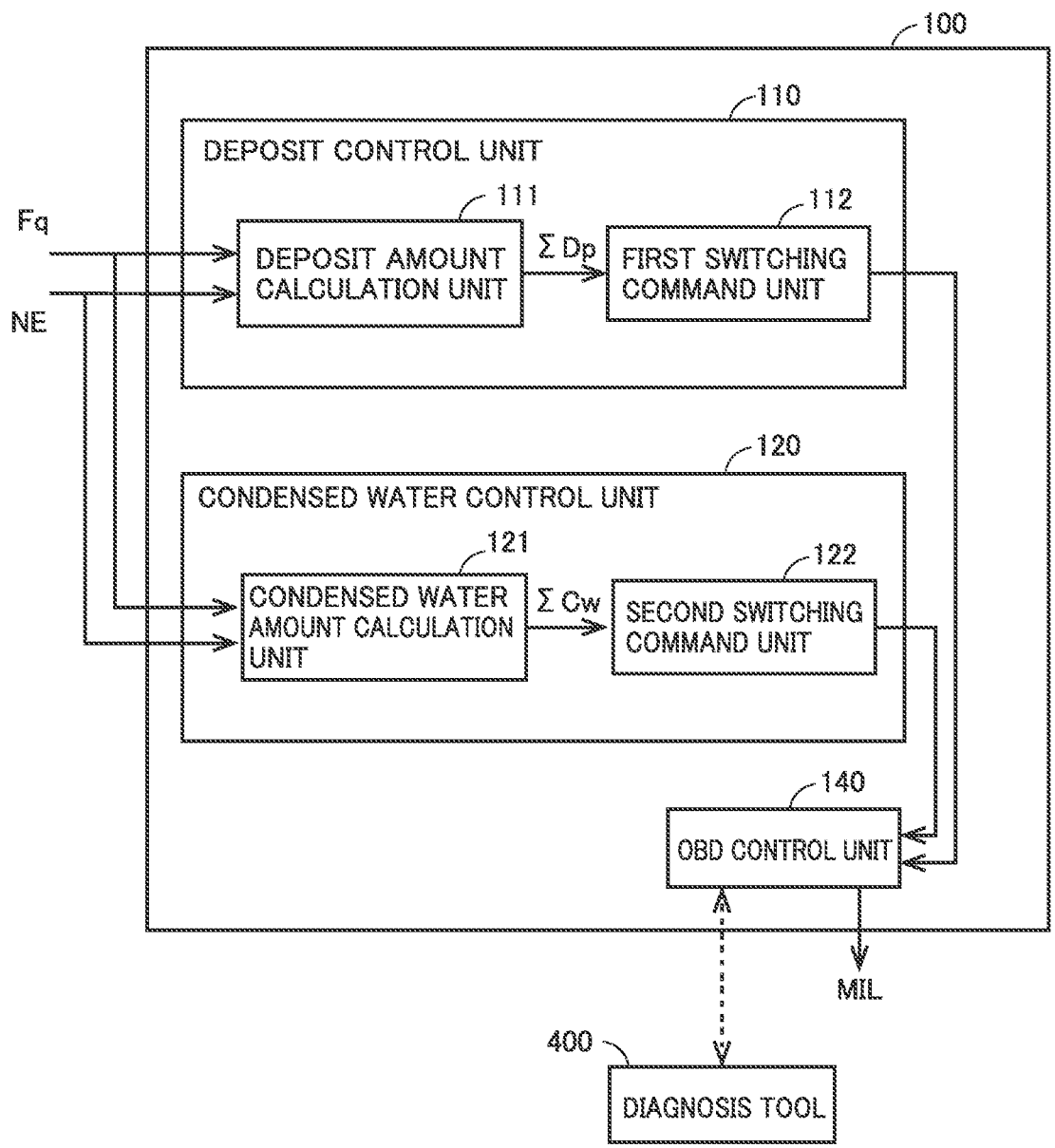
FIG. 11 is a diagram illustrating functional blocks configured in an E/G-ECU 100 according to a second embodiment.

FIG. 11 is a diagram illustrating functional blocks configured in the E/G-ECU 100 according to the second embodiment. A deposit control unit 110 including a deposit amount calculation unit 111 and a first switching command unit 112 and a condensed water control unit 120 including a condensed water amount calculation unit 121 and a second switching command unit 122 have the same configurations as those of the deposit control unit 110 and the condensed water control unit 120 in the first embodiment (see FIG. 7). Therefore, the processing of deposit/condensed water control illustrated in FIG. 8 is executed in the second embodiment as well similarly to the first embodiment.

In FIG. 11, once a switching command is received from the first switching command unit 112 or the second switching command unit 122, an OBD control unit 140 writes a diagnostic code in a memory 102 and turns on a malfunction indication lamp (MIL), which is not illustrated.

Figure 12:
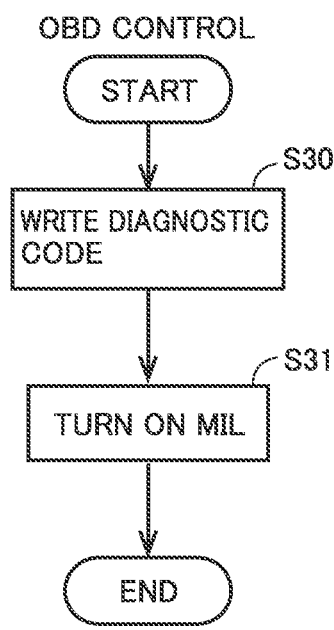
FIG. 12 is a flowchart illustrating processing of OBD control executed by the E/G-ECU 100.

FIG. 12 is a flowchart illustrating processing of OBD control executed by the E/G-ECU 100. Interruption processing of this flowchart is performed when a flag Fc is set to 1. When the flag Fc is set to 1 in S17 in FIG. 8, and interruption processing of the OBD control is performed, the diagnostic code is written in the memory 102 in S30. The diagnostic code is a code indicating a state in which the accumulation amount ΣDp of deposit is a first threshold value α or more or the retention amount ΣCw of condensed water is a second threshold value β or more, and a code "P1001", for example, may be used. Note that the diagnostic code written in S30 will also be referred to as an EGR code. Subsequently, the MIL is turned on in S31, and this routine is then ended.

Figure 13:
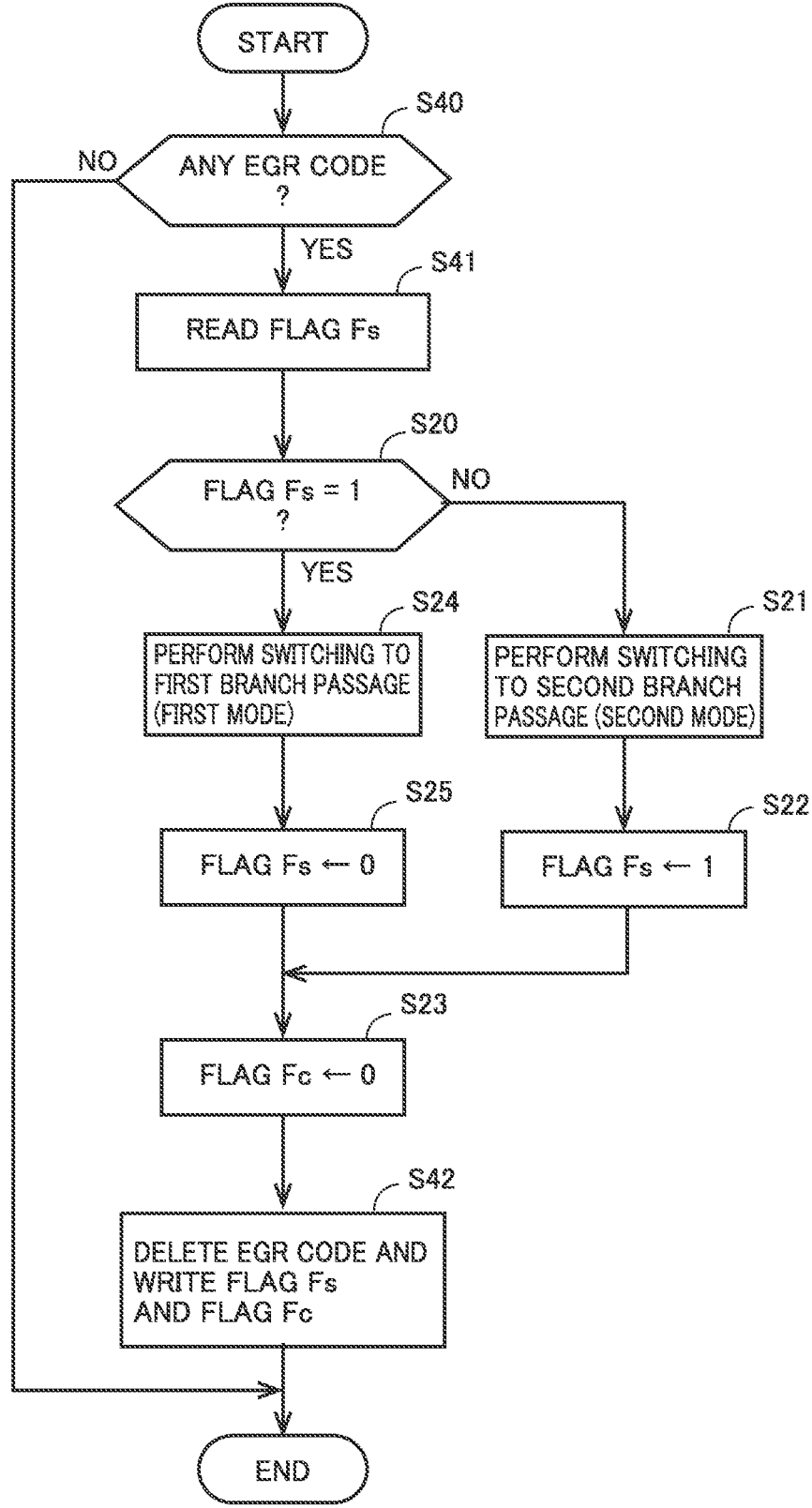
FIG. 13 is a flowchart illustrating diagnosis/switching processing executed by a diagnosis tool 400.

In response to the MIL being turned on, the diagnosis tool 400 is connected to the E/G-ECU 100, and abnormal diagnosis of the internal combustion engine 1 is performed, when a vehicle with the internal combustion engine 1 mounted therein is put into a maintenance station, for example. FIG. 13 is a flowchart illustrating diagnosis/switching processing executed by the diagnosis tool 400. The processing is executed when the diagnosis tool 400 is connected to the E/G-ECU 100. First, in S40, a diagnostic code stored in the memory 102 is read, and whether or not the read diagnostic code includes an EGR code is determined. When the code "P1001" is present in the diagnostic code read from the memory 102, it is determined that there is an EGR code (the EGR code is detected), for example. In a case where the code "P1001" is not present in the diagnostic code read from the memory 102, negative determination is made, and this processing is ended. When the code "P1001" is present in the diagnostic code read from the memory 102, positive determination is made, and the processing proceeds to S41.

In S41, the flag Fs is read from the memory 102, and the processing proceeds to S20. S20 to S25 are substantially the same processing in S20 to S25 of the mode switching control illustrated in FIG. 10, and detailed description will be omitted. Note that the switching to the first mode in S21 and the switching to the second mode in S24 are executed by controlling the switching valve 62, the opening/closing valve 64a, and the opening/closing valve 64b via the E/G-ECU 100.

In S42 processed after S23, the EGR code store in the memory 102 is deleted (reset), and the flag Fs and the flag Fc are written in the memory 102. In this manner, the flag Fc stored in the memory 102 is set to 0. The flag Fs stored in the memory 102 is set to 0 when S25 is processed, or is set to 1 when S21 is processed. Once S42 is processed, this processing is ended.

In the second embodiment, the diagnosis tool 400 capable of communicating with the E/G-ECU 100 controls the switching unit (the switching valve 62, the opening/closing valve 64a, and the opening/closing valve 64b) to perform switching between the first mode and the second mode. In the first embodiment, the switching control unit 130 switches the inlet and the outlet of the EGR cooler 61 while the internal combustion engine 1 is operating (working), and there is a likelihood that the EGR rate may significantly vary while the internal combustion engine 1 is working and it may provide an uncomfortable feeling to a user. In the second embodiment, the inlet and the outlet of the EGR cooler 61 are switched at the time of performing abnormal diagnosis of the internal combustion engine 1 by using the diagnosis tool 400 in a maintenance station, when the accumulation amount $\Sigma Dp$ of deposit exceeds the first threshold value $\alpha$, the first switching command unit 112 outputs a switching command, and the EGR code is written, or when the retention amount $\Sigma Cw$ of condensed water exceeds the second threshold value $\beta$, the second switching command unit 122 outputs a switching command, and the EGR code is written. The abnormality diagnosis of the internal combustion engine 1 is performed by using the EGR code, and it is thus possible to perform diagnosis without causing the internal combustion engine 1 to operate (work) and to curb significant variations in EGR rate, which may otherwise provide an uncomfortable feeling to the user, while the internal combustion engine 1 is working.

At least one of the deposit control unit 110 and the condensed water control unit 120 may be configured in the E/G-ECU 100 in the second embodiment as well.

Note that in the second embodiment, the diagnosis tool 400 performs switching between the first mode and the second mode by processing in S21 or S24 (see FIG. 13). However, a command to perform switching to the first mode and a command to perform switching to the second mode may be displayed on a display of the diagnosis tool 400, and a maintenance engineer may perform switching between the first mode and the second mode by operating the diagnosis tool 400 in accordance with these commands.

Third Embodiment

Since the flowing directions of the EGR gas differ in the first mode and the second mode, cooling efficiency of the EGR cooler 61 may change. Referring to FIG. 2, cooling water flows in from the one side of the second EGR cooler 61b and flows out from the other side of the first EGR cooler 61a as illustrated by the arrows in FIG. 2. Therefore, since the flows of the EGR gas and the cooling water are counter currents in the first mode, and the flows of the EGR gas and the cooling water are parallel currents in the second mode, the cooling efficiency of the EGR cooler 61 may be degraded in the second mode as compared with the first mode.

In the first embodiment and the second embodiment, control is performed to perform alternative switching between the first mode and the second mode of the EGR device 60, and the first mode and the second mode thus continue in substantially the same periods. In the third embodiment, a period during which the internal combustion engine 1 is operated in the second mode is shortened thereby to reduce influences of a change in cooling efficiency even when the switching from the first mode to the second mode is performed and the cooling efficiency changes.

Figure 14:
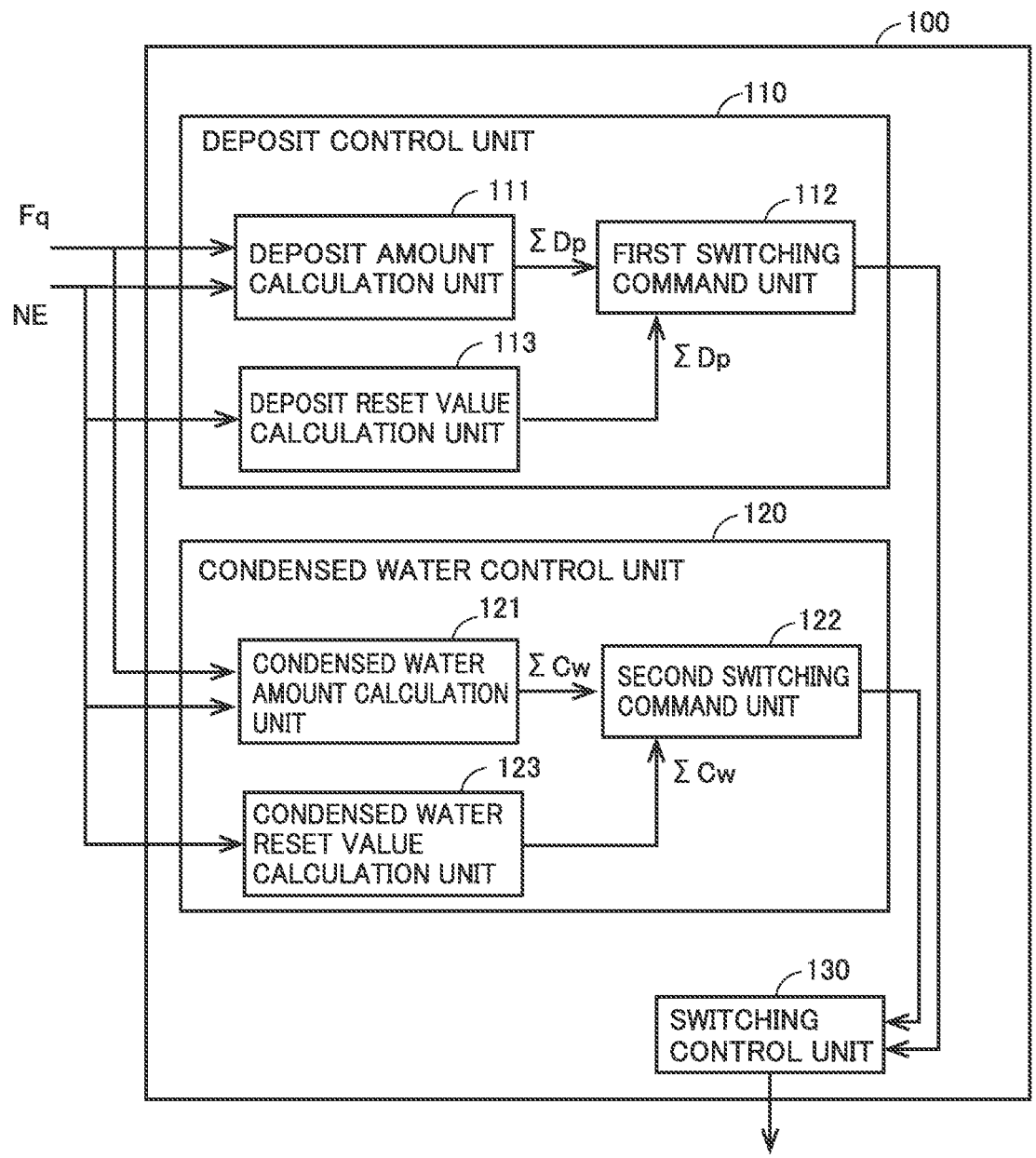
FIG. 14 is a diagram illustrating functional blocks configured in an E/G-ECU 100 according to a third embodiment.

FIG. 14 is a diagram illustrating functional blocks configured in an E/G-ECU 100 according to the third embodiment. The functional block diagram in FIG. 14 is obtained by adding a deposit reset value calculation unit 113 to a deposit control unit 110 and adding a condensed water reset value calculation unit 123 to a condensed water control unit 120 as compared with the functional block diagram (see FIG. 7) according to the first embodiment.

The deposit reset value calculation unit 113 subtracts an accumulation amount $\Sigma Dp$ of deposit in the second mode. With this, a deposit amount calculation unit 111 is configured to calculate the accommodation amount $\Sigma Dp$ of deposit in the first mode. A first switching command unit 112 compares the accumulation amount $\Sigma Dp$ of deposit with the first threshold value $\alpha$, and when the accumulation amount $\Sigma Dp$ of deposit is the first threshold value $\alpha$ or more, the first switching command unit 112 outputs a switching command to the switching control unit 130 to perform switching from the first mode to the second mode. Also, when the accumulation amount $\Sigma Dp$ of deposit subtracted by the deposit reset value calculation unit 113 is a first reset value Dps or less, the first switching command unit 112 outputs a switching command to the switching control unit 130 to perform switching from the second mode to the first mode.

The condensed water reset value calculation unit 123 subtracts a retention amount $\Sigma Cw$ of condensed water in the second mode. With this, a condensed water amount calculation unit 121 is configured to calculate the retention amount $\Sigma Cw$ of condensed water in the first mode. The second switching command unit 122 compares the retention amount $\Sigma Cw$ of condensed water with the second threshold value $\beta$, and when the retention amount $\Sigma Cw$ of condensed water is the second threshold value $\beta$ or more, the second switching command unit 122 outputs a switching command to the switching control unit 130 to perform switching from the first mode to the second mode. Also, when the retention amount $\Sigma Cw$ of condensed water subtracted by the condensed water reset value calculation unit 123 is a second reset value Cws or less, the second switching command unit 122 outputs a switching command to the switching control unit 130 to perform switching from the second mode to the first mode.

Figure 15:
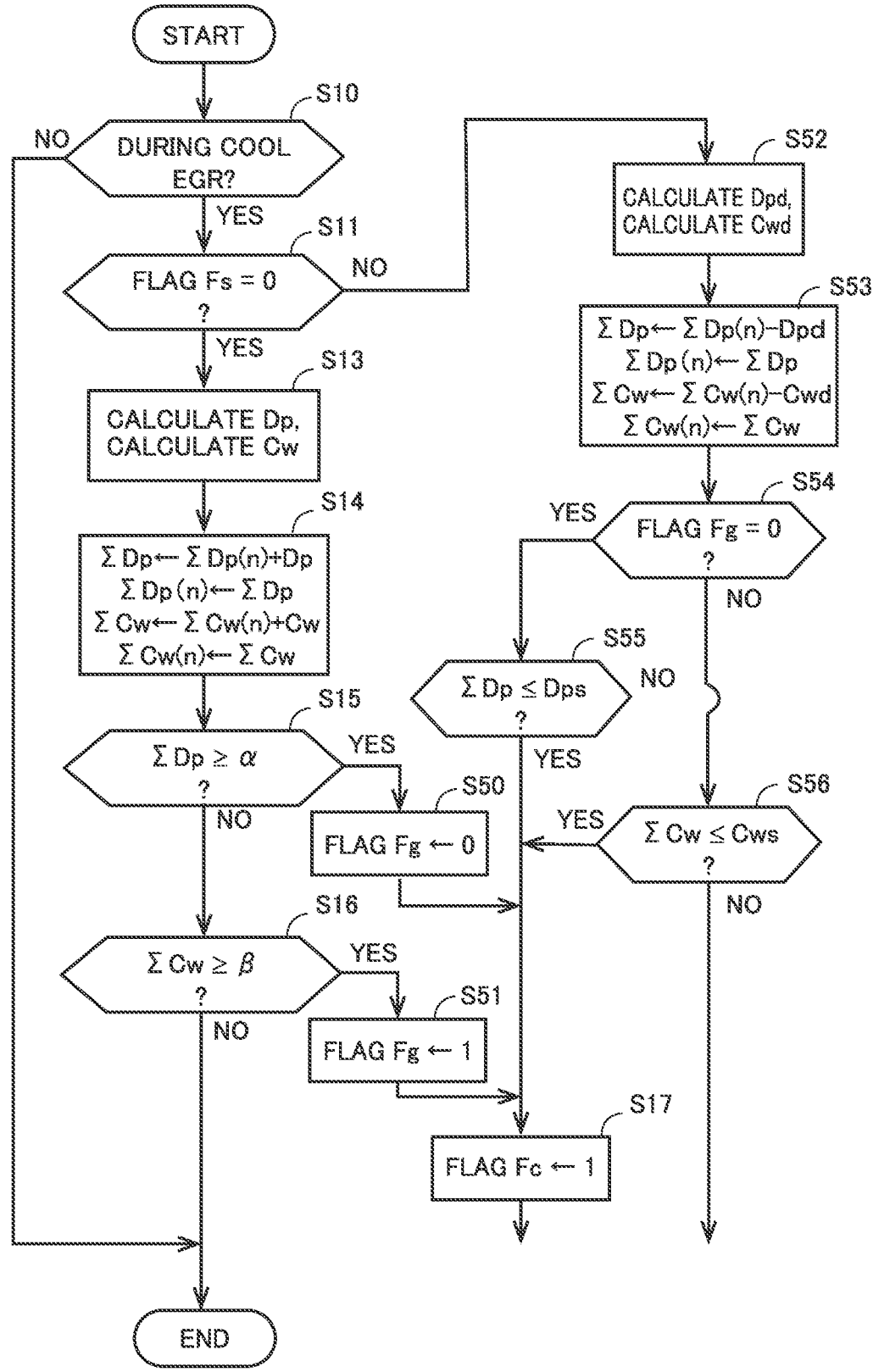
FIG. 15 is a flowchart illustrating processing of deposit/condensed water control executed by the E/G-ECU 100 according to the third embodiment.

FIG. 15 is a flowchart illustrating processing of deposit/condensed water control executed by an E/G-ECU 100 in the third embodiment. The flowchart is obtained by deleting S12 and adding S50 to S56 from and to the flowchart in the first embodiment illustrated in FIGS. 8, S10, S11, and S13 to S17 are similar to those in FIG. 8, and description thereof will thus be omitted. When the flag Fs is 0 and positive determination is made in S11, the processing in and after S13 is performed, and the accumulation amount $\Sigma Dp$ of deposit and the retention amount $\Sigma Cw$ of condensed water are calculated by using, as parameters, the amount of fuel injection Fq and the engine rotation speed NE. In a case where the accumulation amount $\Sigma Dp$ of deposit is the first threshold value $\alpha$ or more ($\Sigma Dp \geq \alpha$) in S15, and positive determination is made, the flag Fg is set to 0 in added S50 before the processing proceeds to S17, and the processing then proceeds to S17. Also, in a case where the retention amount $\Sigma Cw$ of condensed water is the second threshold value $\beta$ or more ($\Sigma Cw \geq \beta$) in S16, and positive determination is made, the flag Fg is set to 1 in added S51 before the processing proceeds to S17, and the processing then proceeds to S17.

When the flag Fs is 1 and negative determination is made in S11, the processing proceeds to S52. The mode switching control illustrated in FIG. 10 is executed in the third embodiment as well similarly to the first embodiment. The first mode is set when the flag Fs is set to 0, and the second mode is set when the flag Fs is set to 1. Therefore, by the processing in S11 being processed, the processing in and after S13 is processed and the accumulation amount $\Sigma Dp$ of deposit and the retention amount $\Sigma Cw$ of condensed water are calculated by using, as parameters, the amount of fuel injection Fq and the engine rotation speed NE in the first mode, and the processing proceeds to S50 in the second mode.

In S52, a removal amount Dpd of deposit is calculated on the basis of the engine rotation speed NE, a removal amount CWd of condensed water is calculated on the basis of the engine rotation speed, and processing proceeds to S51.

In S53, a previous value $\Sigma Dp(n)$ of the accumulation amount of deposit is read from the memory 102, and the accumulation amount $\Sigma Dp$ of deposit is calculated by subtracting the removal amount Dpd of deposit from the previous value $\Sigma Dp(n)$ ($\Sigma Dp=\Sigma Dp(n)-Dps$). Then, the calculated accumulation amount $\Sigma Dp$ of deposit is stored (overwritten) as the previous value $\Sigma Dp(n)$ in the memory 102. Also, a previous value $\Sigma Dw(n)$ of the retention amount of condensed water is read from the memory 102, and the retention amount $\Sigma Cw$ of condensed water is calculated by subtracting the removal amount Cwd of condensed water from the previous value $\Sigma Cw(n)$ ($\Sigma Cw=\Sigma Cw(n)-Cwd$). Then, the calculated retention amount $\Sigma Cw$ of condensed water is stored as the previous value $\Sigma Cw(n)$ in the memory 102, and the processing proceeds to S54.

In S54, whether or not the flag Fg is 0 is determined. In a case where the accumulation amount $\Sigma Dp$ of deposit is the first threshold value $\alpha$ or more, and the second mode is set, the flag Fg is 0, positive determination is made, and the processing proceeds to S55. In a case where the retention amount $\Sigma Cw$ of condensed water is the second threshold value $\beta$ or more, and the second mode is set, the flag Fg is 1, negative determination is made, and the processing proceeds to S56.

In S55, whether or not the accumulation amount $\Sigma Dp$ of deposit is the first reset value Dps or less is determined. In a case where the accumulation amount $\Sigma Dp$ of deposit is the first reset value Dps or less ($\Sigma Dp \leq Dps$), positive determination is made, the processing proceeds to S17, the flag Fc is set to 1 in S17, and this routine is then ended. In a case where the accumulation amount $\Sigma Dp$ of deposit is greater than the first reset value Dps ($\Sigma Dp \Sigma Dps$), negative determination is made, and this routine is ended. Note that the first reset value Dps is the same value as the reset value Dps set in S12 in FIG. 7.

In S56, whether or not the retention amount $\Sigma Cw$ of condensed water is the second reset value Cws or less is determined. In a case where the retention amount $\Sigma Cw$ of condensed water is the second reset value Cws or less ($\Sigma Cw \leq Cws$), positive determination is made, processing proceeds to S17, the flag Fc is set to 1 in S17, and this routine is then ended. In a case where the retention amount $\Sigma Cw$ of condensed water is greater than the second reset value Cws ($\Sigma Cw \Sigma Cws$), negative determination is made, and this routine is then ended. Note that the second reset value Cws is the same value as the reset value Cws set in S12 in FIG. 7.

The processing in S52 and S53 corresponds to the deposit reset value calculation unit 113 and the condensed water reset value calculation unit 123. The removal amount Dpd of deposit calculated in S52 is set by determining the operating time of the internal combustion engine 1 after the switching from the first mode to the second mode is performed and before the accumulated deposit peels off from the cooling fins and the like and the accumulation amount $\Sigma Dp$ of deposit decreases from the first threshold value $\alpha$ to the first reset value Dps, in advance through experiments or the like. In a case where the internal combustion engine 1 is mounted in a vehicle, for example, a map of the removal amount Dpd of deposit using the engine rotation speed NE as a parameter may be created on the basis of the operating time of the internal combustion engine 1 after the switching from the first mode to the second mode is performed and before the accumulation amount $\Sigma Dp$ of deposit decreases from the first threshold value $\alpha$ to the first reset value Dps at the time of traveling in a city mode of a worldwide-harmonized light vehicle test cycle (WLCT), and the removal amount Dpd of the deposit may be calculated from the map. The map of the removal amount Dpd of deposit may be a map using, as parameters, the amount of fuel injection Fq and the engine rotation speed NE. Also, the removal amount Dpd of deposit may be determined from the operating time (working time) of the internal combustion engine 1.

Once the EGR device 60 is switched from the first mode to the second mode, the accumulated deposit peels off from the cooling fins and the like due to high-speed EGR gas, and the accumulation amount $\Sigma Dp$ of deposit decreases to the first reset value Dps in a relatively short time. For example, the accumulation amount $\Sigma Dp$ of deposit decreases to the first reset value Dps within 10 minutes after the switching from the first mode to the second mode is performed.

The removal amount Cwd of condensed water calculated in S52 is set by determining an operating time of the internal combustion engine 1 after the switching from the first mode to the second mode is performed and before the remaining condensed water evaporated (volatilized) and removed, and the retention amount $\Sigma Cw$ of condensed water decreases from the second threshold value $\beta$ to the second reset value Cws in advance by experiments or the like. In a case where the internal combustion engine 1 is mounted in a vehicle, for example, a map of the removal amount Cwd of condensed water using the engine rotation speed NE as a parameter may be created on the basis of the operating time of the internal combustion engine 1 after the switching from the first mode to the second mode is performed and the retention amount $\Sigma Cw$ of condensed water decreases from the second threshold value $\beta$ to the second reset value Cws at the time of traveling in the city mode of WLCT, and the removal amount Cwd of condensed water may be calculated from the map. The map of the removal amount Cwd of condensed water may be a map using, as parameters, the amount of fuel injection Fq and the engine rotation speed NE. Also, the removal amount Cwd of condensed water may be determined from the operating time (working time) of the internal combustion engine 1.

Once the EGR device 60 is switched from the first mode to the second mode, the condensed water remaining in the EGR cooler 61 is heated, evaporated, and removed by high-temperature EGR gas, and the removal amount Cwd of condensed water thereby decreases to the second reset value Cws in a relatively short time. For example, the removal amount Cwd of condensed water decreases to the second reset value Cws within 10 minutes after the switching from the first mode to the second mode is performed.

The mode switching control illustrated in FIG. 10 is executed in the third embodiment as well. In other words, once the flag Fc is set to 1 in S17, interruption processing of the mode switching control in FIG. 10 is performed. In this manner, when the first mode (flag Fs=0) is set, the accumulation amount $\Sigma Dp$ of deposit is the first threshold value $\alpha$ or more (positive determination in S15), or the retention amount $\Sigma Cw$ of condensed water is the second threshold value $\beta$ or more (positive determination in S16), and the flag Fc is set to 1, switching from the first mode to the second mode is performed in S21 (see FIG. 10). Also, when the second mode (flag Fs=1) is set, the accumulation amount $\Sigma Dp$ of deposit is the first reset value Dps or less (positive determination in S55), or the retention amount $\Sigma Cw$ of condensed water is the second reset value Cws or less (positive determination in S56), and the flag Fc is set to 1, switching from the second mode to the first mode is performed in S24 (see FIG. 10).

Figure 16:
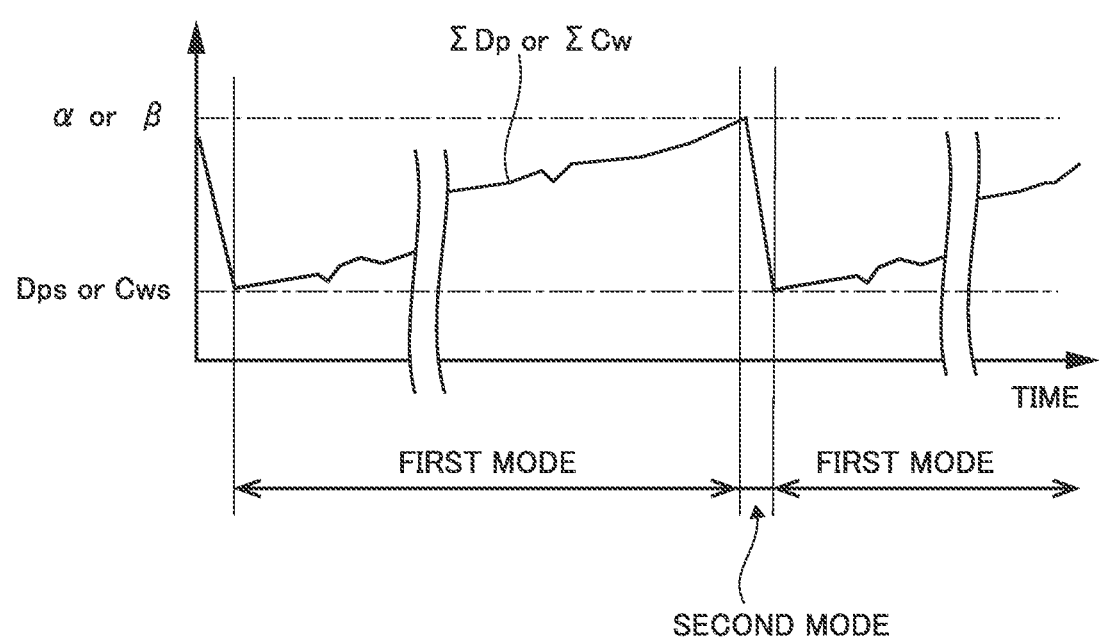
FIG. 16 is a diagram illustrating temporal transition in a first mode and a second mode (temporal transition of the accumulation amount ΣDp of deposit and the retention amount ΣCw of condensed water) according to the third embodiment.

FIG. 16 is a diagram illustrating temporal transition in the first mode and the second mode (temporal transition of the accumulation amount $\Sigma Dp$ of deposit and the retention amount $\Sigma Cw$ of condensed water) according to the third embodiment. According to the third embodiment, the EGR device 60 works in the first mode in which the flows of the EGR gas and the cooling water are counter currents until the accumulation amount $\Sigma Dp$ of deposit reaches the first threshold value $\alpha$ or more or until the retention amount $\Sigma Cw$ of condensed water reaches the second threshold value $\beta$ or more. Then, once the accumulation amount $\Sigma Dp$ of deposit reaches the first threshold value $\alpha$ or more, or once the retention amount $\Sigma Cw$ of condensed water reaches the second threshold value $\beta$ or more, switching from the first mode to the second mode is performed. Since the accumulation of deposit in the EGR cooler 61 and the retention of condensed water in the EGR cooler 61 gradually progress, the operating time (working time) in the first mode continues for a long period of time as illustrated in FIG. 16.

Once switching to the second mode is performed, the accumulated deposit and the remaining condensed water are removed. Since the deposit and the condensed water are removed in a relatively short time as described above, the accumulation amount $\Sigma Dp$ of deposit calculated by the deposit reset value calculation unit 113 reaches the first reset value Dps or less in a short period of time, and the retention amount $\Sigma Cw$ of condensed water calculated by the condensed water reset value calculation unit 123 reaches the second reset value Cws or less in a short period of time. Therefore, since the switching from the second mode to the first mode is performed in a short period of time, it is possible to shorten the period during which the internal combustion engine 1 (EGR device 60) is operated in the second mode as illustrated in FIG. 16.

The present embodiment is configured such that the cooling water flows in from one side of the second EGR cooler 61b and flows out from the other side of the first EGR cooler 61a as illustrated by the arrows in FIG. 2, the flows of the EGR gas and the cooling water become counter currents in the first mode, and the flows of the EGR gas and the cooling water become parallel currents in the second mode. Therefore, it is possible to continue the first mode in which cooling by counter currents with relatively high cooling efficiency is executed for a long period of time, to end the second mode in which cooling by parallel currents with lower cooling efficiency than the counter currents is executed in a relatively short period of time, and thereby to cool the EGR gas with high cooling efficiency as a whole.

At least one of the deposit control unit 110 and the condensed water control unit 120 may be configured in the E/G-ECU 100 in the third embodiment as well.

Fourth Embodiment

In an example in which switching between the first mode and the second mode is performed by using the diagnosis tool 400 as in the second embodiment, a period during which the internal combustion engine 1 is operated in the second mode may be shortened to reduce influences of a change in cooling efficiency even when the switching from the first mode to the second mode is performed and the cooling efficiency changes.

Figure 17:
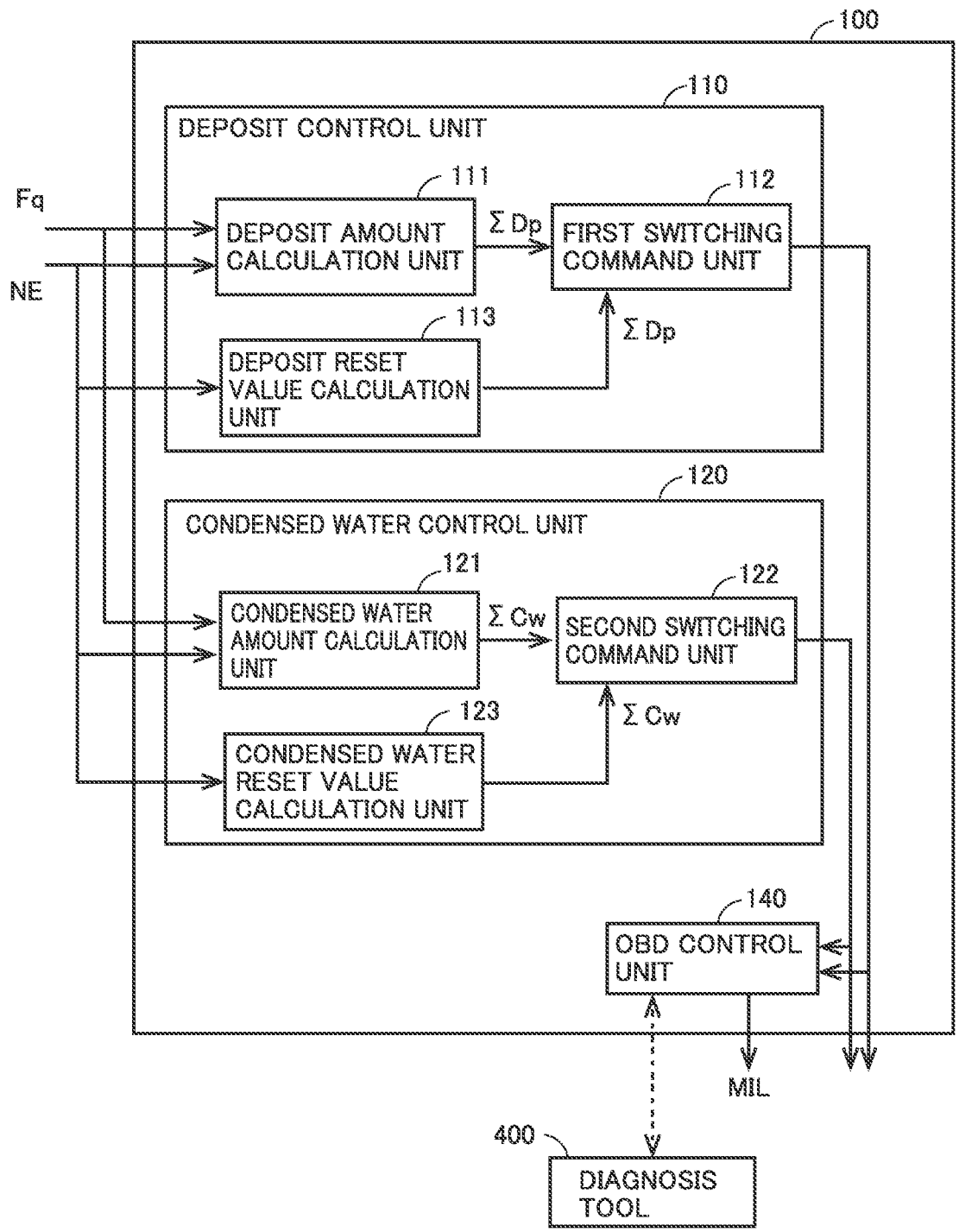
FIG. 17 is a diagram illustrating functional blocks configured in an E/G-ECU 100 according to a fourth embodiment.

FIG. 17 is a diagram illustrating functional blocks configured in an E/G-ECU 100 according to a fourth embodiment. The functional block diagram in FIG. 17 is obtained by replacing the switching control unit 130 in the functional block diagram (see FIG. 14) according to the third embodiment with an OBD control unit 140. The OBD control unit 140 is substantially the same as the OBD control unit 140 in the functional block diagram (see FIG. 11) according to the second embodiment, and once a switching command (flag Fc=1) is received from the first switching command unit 112 or the second switching command unit 122, the OBD control unit 140 writes a diagnostic code in a memory 102 and turns on an MIL, which is not illustrated.

Since the deposit reset value calculation unit 113 and the condensed water reset value calculation unit 123 in FIG. 17 are the same as those in the third embodiment (see FIG. 14), description thereof will be omitted. Note that in the fourth embodiment, a deposit control unit 110 controls a switching unit (a switching valve 62, an opening/closing valve 64a, and an opening/closing valve 64b) such that when an accumulation amount $\Sigma Dp$ of deposit subtracted by the deposit reset value calculation unit 113 reaches a first reset value Dps or less, switching from the second mode to the first mode is performed. Also, a condensed water control unit 120 controls switching unit such that when a retention amount $\Sigma Cw$ of condensed water subtracted by the condensed water reset value calculation unit 123 reaches a second reset value Cws or less, switching from the second mode to the first mode is performed.

Figure 18:
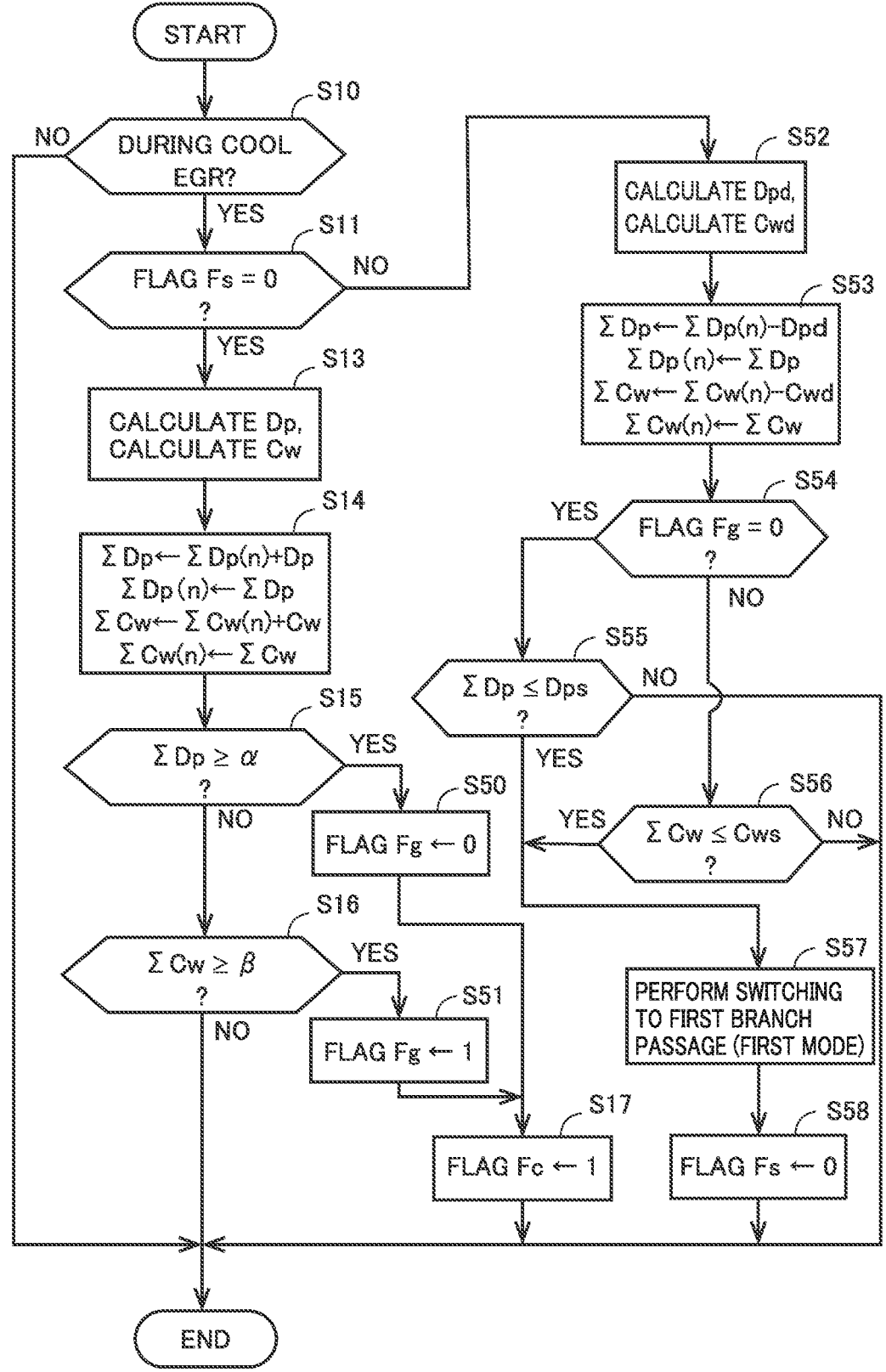
FIG. 18 is a flowchart illustrating processing of deposit/condensed water control executed by the E/G-ECU 100 according to the fourth embodiment.

FIG. 18 is a flowchart illustrating processing of deposit/ condensed water control executed by an E/G-ECU 100 according to the fourth embodiment. The flowchart is obtained by adding S57 and S58 to the flowchart in the third embodiment illustrated in FIG. 15, and description of the same processing as that in the flowchart in FIG. 15 will be omitted.

In the fourth embodiment, processing of OBD control illustrated in FIG. 12 is performed similarly to the second embodiment. In other words, once the flag Fc is set to 1 in S17 in FIG. 15, interruption processing of the OBD control illustrated in FIG. 12 is performed, a diagnostic code (EGR code) is written in the memory 102, and the MIL is turned on.

Figure 19:
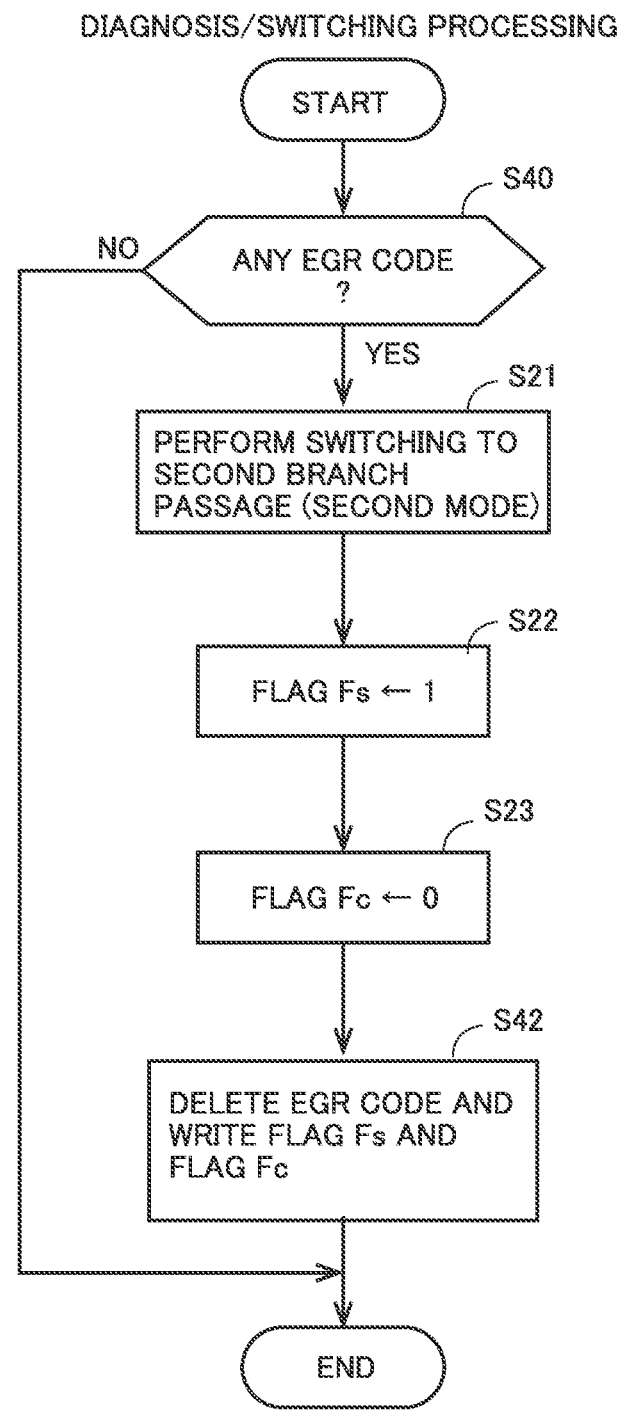
FIG. 19 is a flowchart illustrating diagnosis/switching processing executed by the E/G-ECU 100 according to the fourth embodiment.

FIG. 19 is a flowchart illustrating diagnosis/switching processing executed by the E/G-ECU 100 according to the fourth embodiment. The processing is executed when the diagnosis tool 400 is connected to the E/G-ECU 100. This is processing in which S41, S20, S24, and S25 are omitted from the flowchart of the diagnosis/switching processing in the second embodiment illustrated in FIG. 13. In S40, the diagnostic code stored in the memory 102 is read, whether or not an EGR code is included in the rear diagnostic code is determined, and in a case where no EGR code is included, negative determination is made, and this processing is ended. In a case where the diagnostic code includes an EGR code, positive determination is made, and processing in and after S21 is executed. The processing in and after S21 is the same as that in the second embodiment (FIG. 13), and description thereof will thus be omitted.

Therefore, the EGR device 60 is switched from the first mode to the second mode by connecting the diagnosis tool 400 to the E/G-ECU 100 after the diagnostic code (EGR code) is written in the memory 102 and executing the diagnosis/switching processing illustrated in FIG. 19.

When the EGR device 60 is switched from the first mode to the second mode by the diagnosis/switching processing being executed, the flag Fs is set to 1 (S22 in FIG. 19), negative determination is thus made in S11 with reference to FIG. 18, and the processing in and after S52 is executed. In a case where the accumulation amount ΣDp of deposit reaches the first threshold value α or more, and switching to the second mode is performed through the diagnosis/switching processing, the flag Fg is 0, positive determination is made in S54, processing proceeds to S55, and when the accumulation amount ΣDp of deposit calculated (subtracted) in S53 is the first reset value Dps or less, the processing proceeds to S57. Also, in a case where the retention amount ΣCw of condensed water reaches the second threshold value β or more, and switching to the second mode is performed through the diagnosis/switching processing, the flag Fg is 1, negative determination is made in S54 and the processing proceeds to S56, and when the retention amount ΣCw of condensed water calculated (subtracted) in S53 is the second reset value Cws or less, the processing proceeds to S57.

In S57, the switching unit (switching valve 62, the opening/closing valve 64a, and the opening/closing valve 64b) is controlled, the EGR device is switched to the first mode (see FIG. 3), the processing then proceeds to S58, the flag Fs is set to 0, and this routine is ended.

It is possible to shorten the period during which the internal combustion engine 1 (EGR device 60) is operated in the second mode in the fourth embodiment as well similarly to the third embodiment. Therefore, it is possible to continue the first mode in which cooling by counter currents with relatively high cooling efficiency is executed for a long period of time, to end the second mode in which cooling by parallel currents with lower cooling efficiency than the counter currents is executed in a relatively short period of time, and thereby to cool the EGR gas with high cooling efficiency as a whole.

At least one of the deposit control unit 110 and the condensed water control unit 120 may be configured in the E/G-ECU 100 in the fourth embodiment as well.

Modification Example

Figure 20:
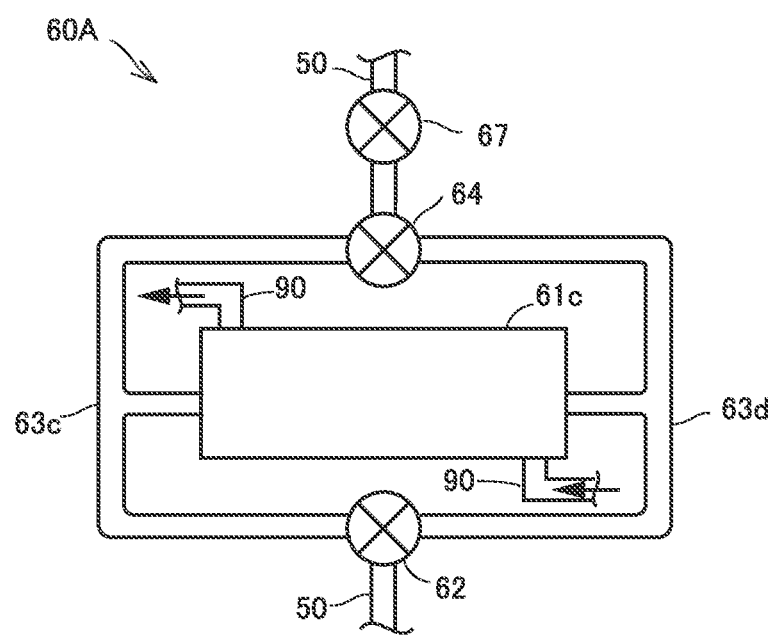
FIG. 20 is a diagram illustrating an overview configuration of an EGR device 60A according to a modification example.

The EGR cooler 61 is composed of the first EGR cooler 61a and the second EGR cooler 61b in the aforementioned embodiments. However, the configuration of the EGR cooler is not limited thereto. FIG. 20 is a diagram illustrating an overview configuration of an EGR device 60A according to a modification example. Referring to FIG. 20, an EGR passage 50 is branched into a first branch passage 63c and a second branch passage 63d at a switching valve 62 as a junction. The switching valve 62 may be, for example, a three-way valve. The downstream side of the first branch passage 63c is connected to an EGR valve 67 via a switching valve 64. The downstream side of the second branch passage 63d is connected to the EGR valve 67 via the switching valve 64. The switching valve 64 may be, for example, a three-way valve.

An intermediate portion (intermediate point) of the first branch passage 63c is connected to one side of an EGR cooler 61c, and an intermediate portion (intermediate point) of the second branch passage 63d is connected to the other side of the EGR cooler 61c. In this manner, the intermediate portion of the first branch passage 63c and the intermediate portion of the second branch passage 63d communicate with each other via the EGR cooler 61c.

The cooling water passage 90 is connected to the EGR cooler 61c. The cooling water flows in from the other side of the EGR cooler 61c and flows out from the one side of the EGR cooler 61c as illustrated by the arrows in FIG. 20.

Figure 21:
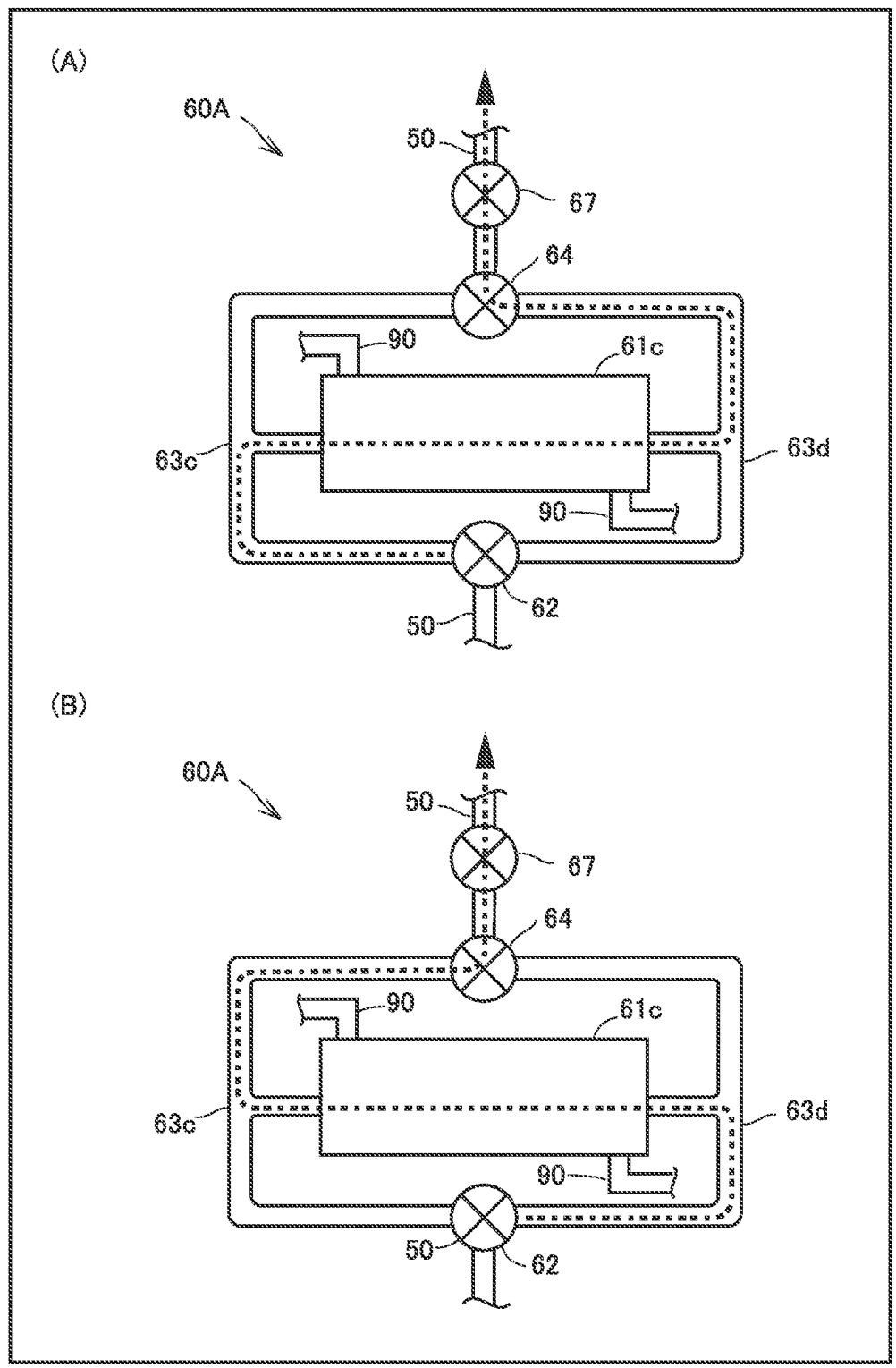
FIG. 21 is a diagram for explaining a first mode and a second mode of the EGR device 60A.

FIG. 21 is a diagram for explaining a first mode and a second mode of the EGR device 60A. FIG. 21(A) is the first mode, and FIG. 21(B) is the second mode. As illustrated in FIG. 21(A), the switching valve 62 is switched such that the EGR passage 50 communicates with the first branch passage 63c and communication between the EGR passage 50 and the second branch passage 63d is blocked, in the first mode. Also, the switching valve 64 is switched such that the EGR valve 67 and the second branch passage 63d communicate with each other and communication between the EGR valve 67 and the first branch passage 63c is blocked. Then, the EGR gas flows through the first branch passage 63c, flows in from the one side of the EGR cooler 61c, flows out from the other side of the EGR cooler 61c, and flows into the intake manifold 28 via the EGR valve 67 as illustrated by the dashed line arrow in FIG. 21(A). In the first mode, the one side of the EGR cooler 61c corresponds to the inlet, and the other side of the EGR cooler 61c corresponds to the outlet.

As illustrated in FIG. 21(B), the switching valve 62 is switched such that the EGR passage 50 communicates with the second branch passage 63d and the communication between the EGR passage 50 and the first branch passage 63c is blocked in the second mode. Also, the switching valve 64 is switched such that the EGR valve 67 and the first branch passage 63c communicate with each other and communication between the EGR valve 67 and the second branch passage 63d is blocked. Then, the EGR gas flows through the second branch passage 63d, flows in from the other side of the EGR cooler 61c, flows out from the one side of the EGR cooler 61c, and flows into the intake manifold 28 via the EGR valve 67 as illustrated by the dashed-line arrow in FIG. 21(B). In the second mode, the other side of the EGR cooler 61c corresponds to the inlet, and the one side of the EGR cooler 61c corresponds to the outlet.

Figure 22:
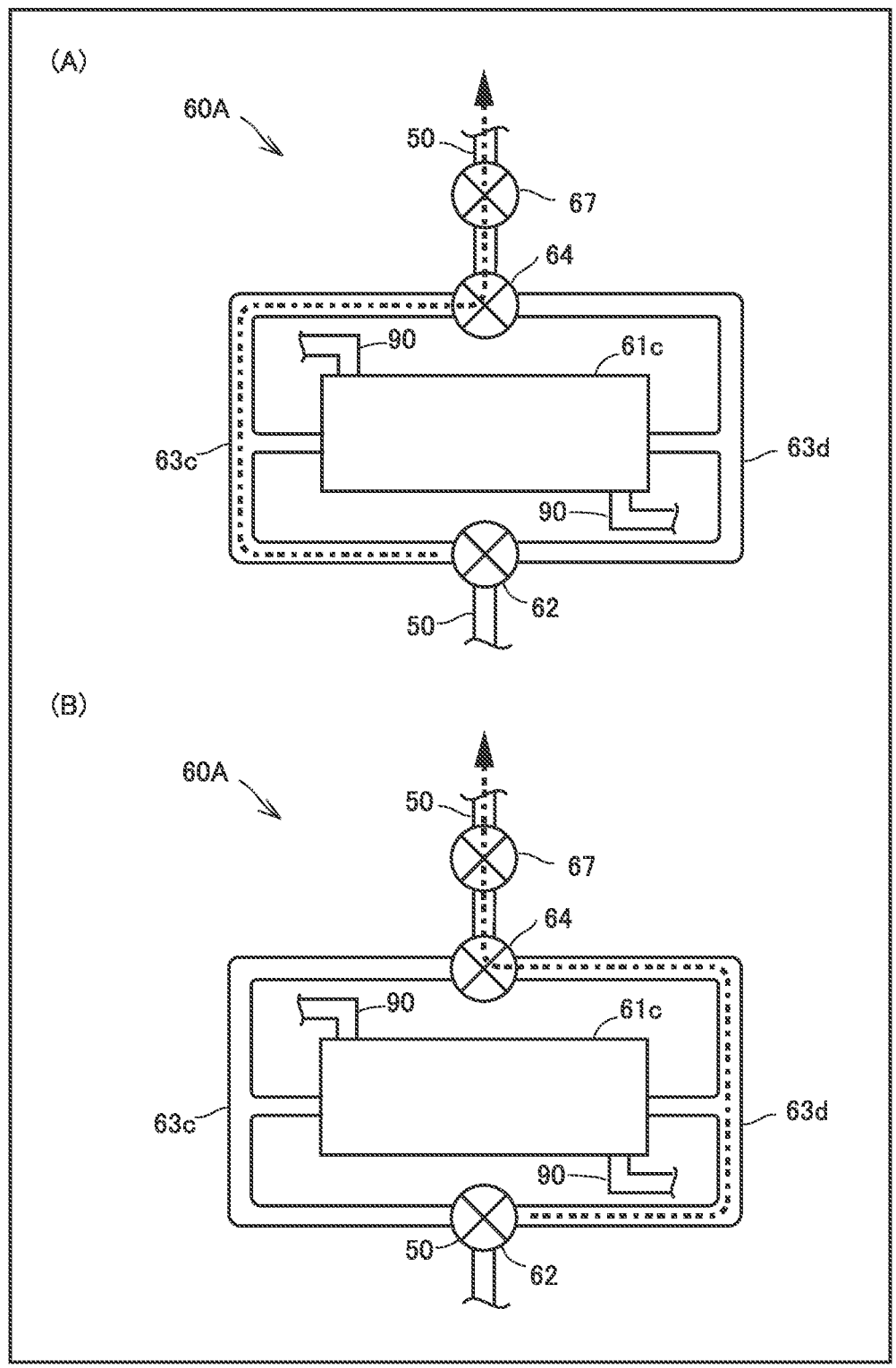
FIG. 22 is a diagram for explaining a bypass mode for bypassing an EGR cooler 61c.

FIG. 22 is a diagram for explaining a bypass mode in which the EGR cooler 61c is bypassed. FIG. 22(A) is a diagram for explaining the bypass mode while the EGR device 60A is working in the first mode, and FIG. 22(B) is a diagram for explaining the bypass mode in which the EGR device 60A is working in the second mode.

During working in the first mode described in FIG. 21(A), the switching valve 64 is switched such that the EGR valve 67 and the first branch passage 63c communicate with each other and communication between the EGR valve 67 and the second branch passage 63d is blocked. Then, the EGR gas bypasses the EGR cooler 61c without flowing into the EGR cooler 61c and flows into the intake manifold 28 via the EGR valve 67 as illustrated by the dashed-line arrow in FIG. 22(A).

During working in the second mode described in FIG. 21(B), the switching valve 64 is switched such that the EGR valve 67 and the second branch passage 63d communicate with each other and communication between the EGR valve 67 and the first branch passage 63c is blocked. Then, the EGR gas bypasses the EGR cooler 61c without flowing into the EGR cooler 61c and flows into the intake manifold 28 via the EGR valve 67 as illustrated by the dashed-line arrow in FIG. 22(B).

As in the modification example, the EGR device 60 may include one EGR cooler as long as the EGR device 60 includes an EGR cooler capable of switching its inlet and outlet.

Although the diesel engine has been described as the internal combustion engine 1 in the embodiments, the internal combustion engine 1 may be a gasoline engine (spark ignition internal combustion engine).

As implementation examples of the present disclosure, the following examples can be listed.

1) An internal combustion engine (1) including an exhaust gas recirculation device (60) that refluxes EGR gas, which is a part of exhaust, to an intake passage (20, 28), the internal combustion engine (1) including: an EGR cooler (61) that is provided in an EGR passage (50) through which the EGR gas flows and that cools the EGR gas; a switching unit (62, 64, 64a, 64b) that switches a direction in which the EGR gas flows between a first mode in which the EGR gas flows through the EGR cooler (61) in a predetermined direction and a second mode in which the EGR gas flows through the EGR cooler (61) in a direction opposite to the predetermined direction; and a control device (100), in which the control device includes at least one of a deposit control unit (110) and a condensed water control unit (120), the deposit control unit (110) includes a deposit amount calculation unit (111) that calculates an accumulation amount of deposit accumulated in the EGR cooler (61) by using, as parameters, an amount of fuel injection and a rotation speed of the internal combustion engine, and a first switching command unit (112) that provides a command to perform switching between the first mode and the second mode when the accumulation amount of deposit exceeds a first threshold value, and the condensed water control unit (121) includes a condensed water amount calculation unit (121) that calculates a retention amount of condensed water retained in the EGR cooler (61) by using, as parameters, the amount of fuel injection and the rotation speed, and a second switching command unit (122) that provides a command to perform switching between the first mode and the second mode when the retention amount of condensed water exceeds a second threshold value.

2) In 1, the deposit control unit (110) writes, in a memory (120), a diagnostic code indicating that the accumulation amount of deposit has exceeded the first threshold value when the accumulation amount of deposit exceeds the first threshold value, and the condensed water control unit (120) writes, in the memory (120), a diagnostic code indicating that the retention amount of condensed water has exceeded the second threshold value when the retention amount of condensed water exceeds the second threshold value.

3) In 2, the control device (100) is configured to be able to communicate with a diagnosis tool (400), and the diagnosis tool (400) controls a switching unit via the control device (100) to perform switching between the first mode and the second mode when the diagnosis tool (400) detects the diagnostic code indicating that the accumulation amount of deposit has exceeded the first threshold value or when the diagnosis tool (400) detects the diagnostic code indicating that the retention amount of condensed water has exceeded the second threshold value.

4) In 1, the first mode is a mode in which the EGR gas flows in from one side of the EGR cooler (61) and the EGR gas flows out from the other side of the EGR cooler (61), the second mode is a mode in which the EGR gas flows in from the other side of the EGR cooler (61) and the EGR gas flows out from the one side of the EGR cooler (61), the EGR cooler (61) is provided with a cooling water passage through which cooling water flows in from the other side of the EGR cooler (61) and the cooling water flows out from the one side of the EGR cooler (61), flows of the EGR gas and the cooling water are counter currents in the first mode, and the flows of the EGR gas and the cooling water become parallel currents in the second mode.

5) In 4, the deposit amount calculation unit (110) is configured to calculate the accumulation amount of deposit in the first mode, the deposit control unit (110) further includes a deposit reset value calculation unit (113) that subtracts the accumulation amount of deposit in the second mode, switching between the first mode and the second mode is performed when the accumulation amount of deposit calculated by the deposit amount calculation unit (110) exceeds the first threshold value, switching from the second mode to the first mode is performed when the accumulation amount of deposit calculated by the deposit reset value calculation unit (113) reaches a first reset value or less, the condensed water amount calculation unit (121) is configured to calculate the retention amount of condensed water in the first mode, the condensed water control unit (120) further includes a condensed water reset value calculation unit (123) that subtracts the retention amount of condensed water in the second mode, switching from the first mode to the second mode is performed when the retention amount of condensed water calculated by the condensed water amount calculation unit (121) exceeds the second threshold value, and switching from the second mode to the first mode is performed when the retention amount of condensed water calculated by the condensed water reset value calculation unit (123) reaches a second reset value or less.

The embodiments disclosed herein should be considered as illustrative examples rather than limitations in all respects. The scope of the present disclosure is indicated by the claims rather than the above description of the embodiments, and all modifications within the meaning and the scope equivalent to the scope of the claims are intended to be included therein.

REFERENCE SIGNS LIST

1 Internal combustion engine, 10 Internal combustion engine main body, 12 Cylinder (air cylinder), 14 Fuel injection valve, 20 Intake passage, 22 Air cleaner, 24 Intercooler, 26 Intake throttle valve, 28 intake manifold, 30 Turbosupercharger, 32 Compressor, 34 Turbine, 40 Exhaust manifold, 42 Exhaust passage, 50 EGR passage, 60, 60A EGR device, 61, 61c EGR cooler, 61a First EGR cooler, 61b Second EGR cooler, 62 Switching valve, 63a, 63c First branch passage, 63b, 63d Second branch passage, 64 Switching valve, 64a Opening/closing valve, 64b Opening/closing valve, 65 Gathering passage, 66 Connection passage, 67 EGR valve, 70 Oxidation catalyst, 72 DPF, 74 Selective reduction catalyst (SCR catalyst), 76 Oxidation catalyst, 80 Urea supplementation valve, 82 Urea water tank, 90 Cooling water passage, 91 Cooling water connection passage, 100 E/G-ECU, 101 CPU, 102 Memory, 110 Deposit control unit, 111 Deposit amount calculation unit, 112 First switching command unit, 113 Deposit reset value calculation unit, 120 Condensed water control unit, 121 Condensed water amount calculation unit, 122 Second switching command unit, 123 Condensed water reset value calculation unit, 130 Switching control unit, 140 OBD control unit, 151 Accelerator position sensor, 152 Vehicle speed sensor, 153 Engine rotation speed sensor, 154 Engine cooling water temperature sensor, 400 Diagnosis tool

The invention claimed is:

1. An internal combustion engine including an exhaust gas recirculation device that refluxes EGR gas, which is a part of exhaust, to an intake passage, the internal combustion engine comprising:
    an EGR cooler that is provided in an EGR passage through which the EGR gas flows and that cools the EGR gas;
    a switching unit that switches a direction in which the EGR gas flows between a first mode in which the EGR gas flows through the EGR cooler in a predetermined direction and a second mode in which the EGR gas flows through the EGR cooler in a direction opposite to the predetermined direction; and
    a control device,
    wherein the control device includes at least one of a deposit control unit and a condensed water control unit,
    the deposit control unit includes
        a deposit amount calculation unit that calculates an accumulation amount of deposit accumulated in the EGR cooler by using, as parameters, an amount of fuel injection and a rotation speed of the internal combustion engine, and
        a first switching command unit that provides a command to perform switching between the first mode and the second mode when the accumulation amount of deposit exceeds a first threshold value,
    the condensed water control unit includes
        a condensed water amount calculation unit that calculates a retention amount of condensed water retained in the EGR cooler by using, as parameters, the amount of fuel injection and the rotation speed, and
        a second switching command unit that provides a command to perform switching between the first mode and the second mode when the retention amount of condensed water exceeds a second threshold value, and
    the deposit is generated by at least soot contained in the EGR gas and the condensed water being joined to each other.

2. The internal combustion engine according to claim 1, wherein the control device is configured to control the switching unit to perform switching between the first mode and the second mode when the first switching command unit provides a command to perform switching between the first mode and the second mode or when the second switching command unit provides a command to perform switching between the first mode and the second mode.

3. The internal combustion engine according to claim 2, wherein the deposit amount calculation unit is configured to calculate the accumulation amount of deposit in the first mode,
    the deposit control unit further includes a deposit reset value calculation unit that subtracts the accumulation amount of deposit in the second mode,
    the control device is configured to control the switching unit to perform switching from the first mode to the second mode when the first switching command unit provides a command to perform switching between the first mode and the second mode and control the switching unit to perform switching from the second mode to the first mode when the accumulation amount of deposit calculated by the deposit reset value calculation unit reaches a first reset value or less,
    the condensed water amount calculation unit is configured to calculate the retention amount of condensed water in the first mode,
    the condensed water control unit further includes a condensed water reset value calculation unit that subtracts the retention amount of condensed water in the second mode, and
    the control device is configured to control the switching unit to perform switching from the first mode to the second mode when the second switching command unit provides a command to perform switching between the first mode and the second mode and control the switching unit to perform switching from the second mode to the first mode when the retention amount of condensed water calculated by the condensed water reset value calculation unit reaches a second reset value or less.

4. The internal combustion engine according to claim 1,
    wherein the control device is configured to be able to communicate with a diagnosis tool, and
    the control device is configured to control the switching unit to perform switching between the first mode and the second mode when the diagnosis tool detects that the first switching command unit provides a command to perform switching between the first mode and the second mode or when the diagnosis tool detects that the second switching command unit provides a command to perform switching between the first mode and the second mode.

5. The internal combustion engine according to claim 4,
    wherein the deposit amount calculation unit is configured to calculate the accumulation amount of deposit in the first mode,
    the deposit control unit further includes a deposit reset value calculation unit that subtracts the accumulation amount of deposit in the second mode,
    the control device
        is configured to control the switching unit to perform switching from the first mode to the second mode when the diagnosis tool detects that the first switching command unit provides a command to perform switching between the first mode and the second mode, and
        is configured to control the switching unit to perform switching from the second mode to the first mode when the accumulation amount of deposit calculated by the deposit reset value calculation unit reaches a first reset value or less,
    the condensed water amount calculation unit is configured to calculate the retention amount of condensed water in the first mode,
    the condensed water control unit further includes a condensed water reset value calculation unit that subtracts the retention amount of condensed water in the second mode, and
    the control device
        is configured to control the switching unit to perform switching from the first mode to the second mode when the diagnosis tool detects that the second switching command unit provides a command to perform switching between the first mode and the second mode, and
        is configured to control the switching unit to perform switching from the second mode to the first mode when the retention amount of condensed water calculated by the condensed water reset value calculation unit reaches a second reset value or less.

6. A method for controlling an internal combustion engine including an exhaust gas recirculation device that refluxes EGR gas, which is a part of exhaust, to an intake passage, the internal combustion engine including an EGR cooler that is provided in an EGR passage through which the EGR gas flows and that cools the EGR gas, and a switching unit that switches a direction in which the EGR gas flows between a first mode in which the EGR gas flows through the EGR cooler in a predetermined direction and a second mode in which the EGR gas flows through the EGR cooler in a direction opposite to the predetermined direction, the control method comprising:

calculating an accumulation amount of deposit accumulated in the EGR cooler by using, as parameters, an amount of fuel injection and a rotation speed of the internal combustion engine, and performing switching between the first mode and the second mode when the accumulation amount of deposit exceeds a first threshold value, wherein the deposit is generated by at least soot contained in the EGR gas and the condensed water retained in the EGR cooler being joined to each other.

7. A method for controlling an internal combustion engine including an exhaust gas recirculation device that refluxes EGR gas, which is a part of exhaust, to an intake passage, the internal combustion engine including an EGR cooler that is provided in an EGR passage through which the EGR gas flows and that cools the EGR gas, and a switching unit that switches a direction in which the EGR gas flows between a first mode in which the EGR gas flows through the EGR cooler in a predetermined direction and a second mode in which the EGR gas flows through the EGR cooler in a direction opposite to the predetermined direction, the control method comprising:

calculating a retention amount of condensed water retained in the EGR cooler by using, as parameters, an amount of fuel injection and a rotation speed of the internal combustion engine, and performing switching between the first mode and the second mode when the retention amount of condensed water exceeds a second threshold value, wherein the deposit accumulated in the EGR cooler is generated by at least soot contained in the EGR gas and the condensed water being joined to each other.

8. The method for controlling an internal combustion engine according to claim 6, wherein the performing of switching between the first mode and the second mode is executed by a diagnosis tool that diagnoses a state of the internal combustion engine.

* * * * *